(12) United States Patent
Hiraishi et al.

(10) Patent No.: US 6,999,234 B2
(45) Date of Patent: Feb. 14, 2006

(54) POLARIZING ELEMENT, AND PLANE LIGHT SOURCE UNIT AND LIQUID CRYSTAL DISPLAY APPARATUS USING THE SAME

(75) Inventors: Masanori Hiraishi, Osaka (JP); Masanari Ohnishi, Himeji (JP)

(73) Assignee: Daicel Chemical Industries, Ltd., Osaka (JP)

(*) Notice: Subject to any disclaimer, the term of this patent is extended or adjusted under 35 U.S.C. 154(b) by 351 days.

(21) Appl. No.: 10/177,124

(22) Filed: Jun. 24, 2002

(65) Prior Publication Data
US 2003/0081313 A1    May 1, 2003

(30) Foreign Application Priority Data
Jun. 22, 2001  (JP) .............................. 2001-189842

(51) Int. Cl.
G02B 5/02 (2006.01)
G02B 5/30 (2006.01)
G02F 1/1335 (2006.01)
B29D 11/00 (2006.01)

(52) U.S. Cl. ............. 359/500; 359/494; 359/900; 349/96; 428/1.31; 264/1.31; 264/1.32

(58) Field of Classification Search ............ 359/492, 359/494, 500, 900; 264/1.31, 1.34; 349/96; 428/1.3, 1.31, 1.33
See application file for complete search history.

(56) References Cited

U.S. PATENT DOCUMENTS

| 4,688,900 A | 8/1987 | Doane et al. ............... 349/87 |
| 4,871,784 A | 10/1989 | Otonari et al. ............. 521/138 |
| 5,751,388 A * | 5/1998 | Larson ....................... 349/96 |
| 5,783,120 A * | 7/1998 | Ouderkirk et al. ......... 264/1.34 |
| 6,517,914 B1 * | 2/2003 | Hiraishi ..................... 428/1.1 |
| 6,627,300 B1 * | 9/2003 | Kent et al. ................. 428/212 |

FOREIGN PATENT DOCUMENTS

| JP | 7-333428 | 12/1995 |
| JP | 8-76114 | 3/1996 |
| JP | 9-506985 | 7/1997 |
| JP | 9-274108 | 10/1997 |
| JP | 9-297204 | 11/1997 |
| JP | 10-221688 | 8/1998 |
| JP | 2000-506990 | 6/2000 |
| JP | 2001-159704 A * | 6/2001 |
| WO | WO 95/17692 | 6/1995 |
| WO | WO 97/32224 | 9/1997 |

* cited by examiner

*Primary Examiner*—John Juba, Jr.
(74) *Attorney, Agent, or Firm*—Birch, Stewart, Kolasch & Birch, LLP

(57) ABSTRACT

A polarizing element having excellent scattering and polarizing properties is made from a stretched sheet composed of a continuous phase and a dispersed phase. The element has continuous and dispersed phases including different resins, and the refractive index differential between the continuous and dispersed phases along the stretched direction of the sheet differs from that perpendicular to the stretched direction. Incident light with a polarization state for which the refractive index differential is smaller is transmitted through the polarizing element, and incident light with a polarization state for which the refractive index differential is larger is scattered by the polarizing element. The continuous phase and the dispersed phase are bonded to each other substantially free from voids between their phases.

26 Claims, 13 Drawing Sheets

POLARIZING ELEMENT, AND PLANE LIGHT SOURCE UNIT AND LIQUID CRYSTAL DISPLAY APPARATUS USING THE SAME

FIELD OF THE INVENTION

The present invention relates to a polarizing element having light-diffusing properties and polarizing properties, and a plane or flat light source unit and a transmission type (transmittable) or reflection type liquid crystal display apparatus which comprise the polarizing element.

BACKGROUND OF THE INVENTION

In a liquid crystal display apparatus, an iodine- or dye-containing absorption type polarizing plate has been used commonly. Therefore, brightness (luminance) of a display surface is turned down to less than half against that of light source such as an outside light or an illuminated light. Moreover, since a liquid crystal panel of the apparatus has two pieces of the absorption type polarizing plate on a front and back (or both sides) thereof, practically, brightness of the panel reduces to 30 to 40% against that of light source. Accordingly, in order to obtain higher luminance of the panel, it is attempt to transform the polarized light to help the above-mentioned failing.

As a method for transforming a polarized light, a method using a polarizer (see, ASIA DISPLAY '95, page 731), a method for transforming the polarized light which utilizes circular polarization property of a cholesteric liquid crystal (see, ASIA DISPLAY '95, page 735) and others are exemplified. However, in the method using the prism, the polarized light depends on an angle or a wavelength thereof, and furthermore the obtained apparatus is short in lightness of weight or compactness thereof. In the case where the cholesteric liquid crystal is used, it is necessary that the liquid crystal comprises multi layers differing in spiral pitch to cover throughout a range of wavelength. However, in such a case, it is complicated and costly to produce such a liquid crystal.

Japanese Patent Application Laid-Open No. 333428/1995 (JP-7-333428A) discloses a scattered type polarizing sheet which comprises a tabular element composed of a birefringent substance and an optical element composed of a synthetic resin, and the optical elements are laminated on the both sides of the tubular element. However, since the sheet uses a single tabular element (calcite), the sheet is restricted in producible size thereof and is expensive.

Japanese Patent Application Laid-Open No. 506985/1997 (JP-9-506985A) discloses an optical display apparatus or device comprising a polarizer which is obtained by multi-laminating films composed of a polyester-series resin and the like. However, also, it is complicated and expensive to produce the polarizer since the laminate composed of hundreds of thin layers is stretched for obtaining the polarizer.

A method using a complex of a liquid crystal and a polymer has been known [Japanese Patent Application Laid-Open No. 76114/1996 (JP-8-76114A), Japanese Patent Application Laid-Open No. 274108/1997 (JP-9-274108A), Japanese Patent Application Laid-Open No. 221688/1998 (JP-10-221688A), and U.S. Pat. No. 4,688,900]. However, the liquid crystal is expensive.

Japanese Patent Application Laid-Open No. 297204/1997 (JP-9-297204A) discloses an anisotropic scattering or diffusing element dispersed and aligned an inorganic scattering particle in a polymer or resin. However, in the case of aligning the scattering particle to a constant direction, the element is apt to generate a void(s) between the polymer and the inorganic particle, and as a result the element can not be produced stably. Incidentally, as a processing method in which the void is not generated easily, it is adopted that a method in which a polymer is subjected to ultraviolet to cure, with aligning an inorganic particle in the polymer by calendering with use of a roller. However, the polymer used in the method is limited.

U.S. Pat. No. 4,871,784 discloses a method which comprises stretching a sheet dispersed a second polymer in a first polymer to generate a microvoid. However, in the method to generate an elliptical microvoid around the dispersoid, the microvoid has various geometrical structures in the interface. Therefore, it is difficult to control polarizing properties of the sheet.

Japanese Patent Application Laid-Open No. 506990/2000 (JP-2000-506990A) discloses a method for stretching a sheet dispersed a second polymer in a first polymer. As a combination of the first polymer with the second polymer, the literature describes a combination of 2,6-polyethelene naphthalene with polymethylmethacrylate or syndiotactic polystyrene. Moreover, the literature describes that a small amount of naphthalenedicarboxylic acid can be utilized in order to improve interphase adhesiveness, and a compatibilizing agent is used in order to form a void. However, when the sheet dispersed the second polymer in the first polymer is stretched, it is impossible to produce the obtained sheet stably because of weakness of the bonding force (associative strength) between the above two polymers, and generation of a slight amount of voids between a continuous phase and a dispersed phase (or discontinuous phase or dispersoid) thereof with stretching. Moreover, the literature describes an embodiment using polystyrene glycidylmethacrylate compatibilizing agent as the compatibilizing agent. However, in such an embodiment, it is impossible to obtain a sheet having stability, and excellent flatness or smoothness of external appearance, because of rapid increase in viscosity and gelation on the end of the agent.

SUMMARY OF THE INVENTION

It is, therefore, an object of the present invention to provide a polarizing element having excellent scattering or diffusing properties and polarizing properties.

It is another object of the invention to provide a uniform polarizing element stably without generating a void (aperture).

A further object of the invention is to provide a plane or flat light source unit and a liquid crystal display apparatus, which have high luminance by utilizing a simple and inexpensive method.

The present inventors did much investigation to accomplish the above objects, and as a result, found that a polarizing element having (provided with) excellent scattering or diffusing properties and polarizing properties can be obtained by forming with a stretched sheet in which a dispersed phase composed of a certain transparent resin is dispersed in the form of a particle in a continuous phase composed of a certain transparent resin. The present invention has been accomplished based on the above findings.

That is, the polarizing element of the present invention comprises a stretched sheet composed of a continuous phase and a dispersed phase (or discontinuous phase or dispersoid) dispersed in the form of a particle in the continuous phase, the continuous phase comprises a first transparent resin and the dispersed phase comprises a second transparent resin, the refractive index differential between the continuous phase and the dispersed phase on a linear polarized light in a stretched direction of the sheet is different from that in a direction perpendicular to the stretched direction, the polarized light in a direction having smaller refractive index differential is transmittable, the polarized light in a direction having larger refractive index differential is scattered, and the continuous phase and the dispersed phase are bonded each other substantially free from voids between the both phases. The polarizing element may comprise a compatibilizing agent having an epoxy group in a main chain thereof, and the compatibilizing agent may be interposed between the continuous phase and the disposed phase to be substantially free from voids between the both phases. In the polarizing element, the absolute value of the refractive index differential between the continuous phase and the dispersed phase in the stretched direction may be not less than 0.1, the absolute value of the refractive index differential between the continuous phase and the dispersed phase in the direction perpendicular to the stretched direction may be not more than 0.05, the mean diameter in a major or longitudinal axial direction of the dispersed phase may be about 0.8 to 10 $\mu$m, the mean diameter in a minor axial direction of the dispersed phase may be about 0.05 to 0.8 $\mu$m, and the mean aspect ratio of the dispersed phase may be about 2 to 1,000. A combination of the first transparent resin and the second transparent resin may be at least one selected from the following combinations: a combination of the first transparent resin having a carboxyl group with the second transparent resin having at least one functional group selected from the group consisting of a hydroxyl group, an amino group and an epoxy group; a combination of the first transparent resin having a hydroxyl group with the second transparent resin having at least one functional group selected from the group consisting of a carboxyl group, an acid anhydride group and an isocyanate group; and a combination of the first transparent resin having an amino group with the second transparent resin having at least one functional group selected from the group consisting of a carboxyl group, an acid anhydride group and an epoxy group. In the case where the polarizing element does not comprise the compatibilizing agent, the first transparent resin may comprise a polyester-series resin (particularly, a crystalline polyester-series resin), and the second transparent resin may comprise a resin being reactive to the polyester-series resin and having at least one functional group selected from an epoxy group, an amino group, an acid anhydride group, a hydroxyl group and an isocyanate group. The second transparent resin may comprise at least one transparent resin selected from the group consisting of an epoxidized styrene-diene-series copolymer, a polyamide-series resin, an anhydrous carboxylic acid-modified polyolefinic-series resin, a polyester-series resin and a polyurethane-series resin, particularly, a styrene-diene-series copolymer having an epoxy group in a main chain thereof. In the polyester-series resin constituting the first transparent resin, a concentration of a carboxyl group in the polyester-series resin may be about 5 to 300 mili-equivalent/kg, or a concentration of a hydroxyl group in the polyester-series resin may be about 5 to 300 mili-equivalent/kg. In the case where the polarizing element comprises the compatibilizing agent, the first transparent resin may comprise a polyester-series resin (particularly, a crystalline polyester-series resin), the second transparent resin may comprise a polystyrenic resin, a polyamide-series resin, etc. (particularly, polystyrene, a styrene-diene-series block copolymer, an aromatic polyamide-series resin and others), and the compatibilizing agent may comprise an epoxidized styrene-diene-series copolymer (particularly, epoxidized styrene-diene-series block copolymer). The ratio of the continuous phase relative to the dispersed phase (weight ratio) may be about 99/1 to 50/50, and preferably about 95/5 to 60/40. The ratio of the dispersed phase relative to the compatibilizing agent (weight ratio) may be about 99/1 to 50/50, and preferably about 95/5 to 60/40. In the polarizing element, the total light transmittance in the direction perpendicular to the stretched direction may be not less than 80%, the total light transmittance in the stretched direction may be not less than 70%, and the element may impart light-diffusing properties and polarizing properties to a transmitted light. In the polarizing element, the total light transmittance in the direction perpendicular to the stretched direction may be not less than 80%, the total light transmittance in the stretched direction may be 30 to 70%, and the element may impart light-diffusing properties and polarizing properties to a transmitted light and a reflected light. In the polarizing element, the total light transmittance in the direction perpendicular to the stretched direction may be not less than 80%, the total light transmittance in the stretched direction may be not more than 30%, and the element may impart light-diffusing properties and polarizing properties to a reflected light. The thickness of the polarizing element is about 3 to 300 $\mu$m. In the polarizing element, the stretched sheet may comprise a sheet stretched monoaxially by a roll calendering. Further, the polarizing element may comprise an isotropic transparent resin layer laminated on the stretched sheet.

The present invention includes a method for producing a polarizing element recited in claim 1, which comprises melt-mixing a first transparent resin with a second transparent resin for molding a sheet, and stretching the sheet monoaxially to produce a polarizing element, wherein a refractive index (refraction index) of the first transparent resin is close to that of the second transparent resin, and the both resins are capable of binding with each other by at least one selected from an intramolecular reactive group and a presence of a compatibilizing agent.

The present invention also includes a plane or flat light source unit or device comprising a tubular light source, a light guide member for being incident a light of the tubular light source from the lateral side and emerging a light from a flat emerge surface, and the polarizing element disposed at or on a light-emerging side of the light guide member.

The present invention also includes a liquid crystal display apparatus or device. The liquid crystal display apparatus may comprise a liquid crystal cell, and the polarizing element disposed at the front side or the back side. The liquid crystal display apparatus may be a transmittable liquid crystal display apparatus and comprise a tubular light source, a light guide member for being incident a light of the tubular light source from the lateral side and emerging a light from a flat emerge surface, a liquid crystal cell, and the polarizing element disposed between the light guide member and the liquid crystal cell, wherein the emerged light from the light guide member is polarized by the polarizing element, and the polarized light is transmitted through the liquid crystal cell. The liquid crystal display apparatus may be a reflection type liquid crystal display apparatus. The reflection type liquid crystal display apparatus may comprise the polarizing element for polarizing an incident light, a reflection member, and a liquid crystal cell disposed between the polarizing element and the reflection member, wherein the incident light is polarized by the polarizing element, the polarized light is transmitted through the liquid crystal cell and reflected by the reflection member, the reflected light is retransmitted through the liquid crystal cell and polarized by the polarizing element. The reflection type liquid crystal display apparatus may comprise a liquid crystal cell, a reflection member, and the polarizing element disposed between the reflection member and the liquid crystal cell, wherein an incident light is transmitted through the liquid crystal cell, the transmitted light is polarized by the polarizing element and reflected by the reflection member, the reflected light is polarized by the polarizing element and transmitted through the liquid crystal cell.

Throughout this specification, the term "sheet" is used without regard to thickness, thus meaning a film as well.

DETAILED DESCRIPTION OF THE INVENTION

[Polarizing Element]

The polarizing element of the present invention shall now be described in detail with reference to the attached drawings. The polarizing element of the invention is formed with a stretched sheet which comprises a continuous phase composed of a first transparent resin, and a dispersed phase composed of a second transparent resin, and the dispersed phase is dispersed in the form of a particle in the continuous phase.

Figure 1:
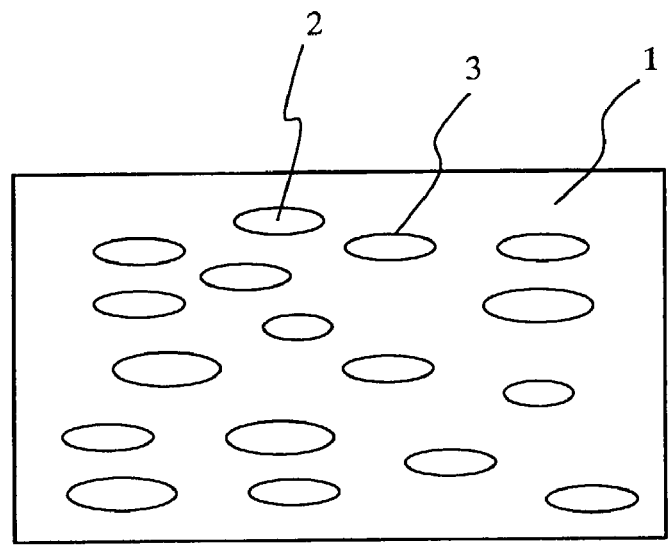
FIG. 1 is a schematic enlarged view showing an embodiment of the polarizing element of the present invention.

FIG. 1 is a schematic enlarged view showing an embodiment of the polarizing element of the invention. In FIG. 1, the polarizing element comprises a continuous phase 1 and a dispersed phase 2, in which the continuous phase 1 forms a substructure (matrix) of the polarizing element and the dispersed phase 2 is present in the matrix and performs polarizing function. The continuous phase 1 is bonded to the dispersed phase 2 substantially free from a void(s) in an interface 3 between the continuous phase 1 and the dispersed phase 2.

Figure 2:
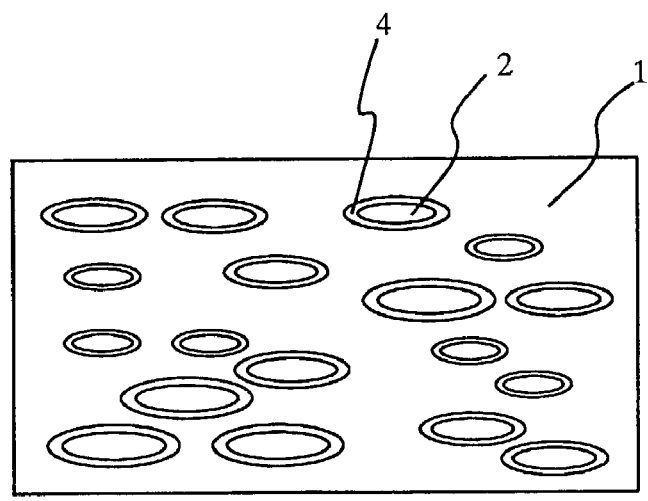
FIG. 2 is a schematic enlarged view showing another embodiment of the polarizing element of the present invention.

FIG. 2 is a schematic enlarged view showing another embodiment of the polarizing element of the invention. In FIG. 2, the polarizing element comprises a continuous phase 1, a dispersed phase 2 and a compatibilizing agent 4, in which the continuous phase 1 forms a substructure (matrix) of the polarizing element, the dispersed phase 2 is present in the matrix and performs polarizing function, and the compatibilizing agent 4 is present in an interface between the continuous phase 1 and the dispersed phase 2. Because of the compatibilizing agent 4 interposed between the continuous phase 1 and the dispersed phase 2, no voids are substantially generated (or present) between the both phases. That is, the compatibilizing agent 4 is bonded to the continuous phase 1, and is also bonded to the dispersed phase 2 with an affinity due to hydrogen bond and the like.

The continuous phase and the dispersed phase comprise a transparent resin, and are usually incompatible or hardly compatible with each other. The transparent resin includes thermoplastic resins [an olefinic resin, a halogen-containing resin, a vinyl alcohol-series resin, a vinyl ester-series resin, a (meth)acrylic resin, a styrenic resin, a polyester-series resin, a polyamide-series resin, a polycarbonate-series resin, a cellulose derivative, etc.] and thermosetting resins (an epoxy resin, an unsaturated polyester resin, a diallyl phthalate resin, a silicone resin, etc.). The preferred transparent resins are the thermoplastic resins.

The olefinic resin includes but is not limited to homo- or copolymers of $C_{2-6}$olefins (polyethylenic resins such as polyethylene, ethylene-propylene copolymer, etc., polypropylene-series resins such as polypropylene, propylene-ethylene copolymer, propylene-butene copolymer, etc., poly (methylpentene-1), propylene-methylpentene copolymer, etc.), and copolymers of $C_{2-6}$olefins and copolymerizable monomers (ethylene-(meth)acrylic acid copolymer, ethylene-(meth)acrylate copolymer, etc.).

The halogen-containing resin includes but is not limited to vinyl halide-series resins (e.g. homopolymers of vinyl chloride or fluorine-containing monomers, such as polyvinyl chloride, polytetrafluoroethylene, polychlorotrifluoroethylene, poly(vinyl fluoride), etc., copolymers of vinyl chloride or fluorine-containing monomers, such as tetrafluoroethylene-hexafluoropropylene copolymer, tetrafluoroethylene-perfluoroalkyl vinyl ether copolymers, etc.; and copolymers of vinyl chloride or fluorine-containing monomers and copolymerizable monomers, such as vinyl chloride-vinyl acetate copolymer, vinyl chloride-(meth)acrylate copolymer, tetrafluoroethylene-ethylene copolymer, etc.), and vinylidene halide-series resins (poly(vinylidene chloride), poly(vinylidene fluoride), copolymers of vinyl chloride or fluorine-containing vinylidene monomers and other monomers).

The derivative of vinyl alcohol-series resin includes polyvinyl alcohol, ethylene-vinyl alcohol copolymers, etc. The vinyl ester-series resin includes homo- or copolymers of vinyl ester-series monomers (e.g. polyvinyl acetate), copolymers of vinyl ester-series monomers and copolymerizable monomers (e.g. vinyl acetate-ethylene copolymer, vinyl acetate-vinyl chloride copolymer, vinyl acetate-(meth)acrylate copolymer, etc.).

The (meth)acrylic resin includes but is not limited to poly(meth)acrylates such as polymethyl(meth)acrylate, methyl methacrylate-(meth)acrylic acid copolymer, methyl methacrylate-(meth)acrylate-(meth)acrylic acid copolymers, methyl methacrylate-(meth)acrylate copolymers, and (meth)acrylate-styrene copolymers (e.g., MS resin). The preferred (meth)acrylic resin includes poly($C_{1-6}$alkyl (meth) acrylate) and methyl methacrylate-acrylate copolymers.

The styrenic resin includes homo- or copolymers of styrenic monomers (e.g. polystyrene, styrene-α-methylstyrene copolymer, etc.), and copolymers of styrenic monomers and copolymerizable monomers [e.g. styrene-acrylonitrile copolymer (AS resin), styrene-(meth)acrylic ester copolymers (such as styrene-methyl methacrylate copolymer), styrene-anhydrous maleic acid copolymer, etc.].

Moreover, the styrenic resin includes a polymer which is graft- or block-copolymerized a continuous phase matrix with a dispersed phase component, and the continuous phase matrix comprises the resin component.

Further, as the styrenic resin, there is exemplified a copolymer of a diene-series monomer and an aromatic vinyl-series monomer, and optionally and other copolymerizable monomer. As such a copolymer, styrene-diene-series copolymers are preferred, and may be random-, block-, or graft-polymerized. The styrene-diene-series random copolymers include styrene-butadiene copolymer (SB resin), styrene-isoprene copolymer (SI resin), hydrogenated styrene-isoprene copolymer (SEP resin), epoxidized styrene-butadiene copolymer and the like. As the styrene-diene-series block copolymers, there are exemplified styrene-butadiene copolymers such as styrene-butadiene copolymer (SB resin) and styrene-butadiene-styrene copolymer (SBS resin), hydrogenated styrene-butadiene-styrene copolymer (SEBS resin), styrene-isoprene copolymer (SI resin), hydrogenated styrene-isoprene copolymer (SEP resin), styrene-isoprene-styrene copolymer (SIS resin), hydrogenated styrene-isoprene-styrene copolymer (SEPS resin), epoxidized styrene-butadiene copolymer, epoxidized styrene-butadiene-styrene copolymer (ESBS resin) and the like. The styrene-diene-series graft copolymers include acrylonitrile-butadiene-styrene copolymer (ABS resin) and the like. Among them, the styrene-diene-series block copolymers are preferred.

The polyester-series resin includes aromatic polyesters obtainable from an aromatic dicarboxylic acid, such as terephthalic acid, and an alkylene glycol [homopolyesters, e.g. polyalkylene terephthalates such as polyethylene terephthalate, polypropylene terephthalate, polybutylene terephthalate, etc. and polyalkylene naphthalates such as polyethylene naphthalate, polybutylene naphthalate, etc.; and copolyesters containing an alkylene arylate unit as a main component (e.g. not less than 50 mole %, preferably 75 to 100 mole %, and more preferably 80 to 100 mole %)], aliphatic polyesters obtainable by using aliphatic dicarboxylic acids such as adipic acid, and liquid-crystalline polyesters.

The polyamide-series resin includes aliphatic polyamides such as nylon 46, nylon 6, nylon 66, nylon 610, nylon 612, nylon 11, nylon 12, etc. and aromatic polyamides obtainable from a monomer containing an aromatic dicarboxylic acid (such as terephthalic acid and isophthalic acid) and/or an aromatic diamine (such as xylylenediamine). The aromatic polyamides may be, for example, a polyamide obtainable by a reaction of the aromatic diamine with an aliphatic $C_{6-12}$dicarboxylic acid [such as xylylenediamine adipate (MXD-6)], among others. The polyamide-series resin is not restricted to homopolyamides but may be copolyamides.

The polycarbonate-series resin includes aromatic polycarbonates based on bisphenols (e.g. bisphenol A) and aliphatic polycarbonates such as diethylene glycol bis-aryl carbonates.

The cellulose derivative includes cellulose esters (e.g. cellulose acetate, cellulose propionate, cellulose butyrate, cellulose phthalate, etc.), cellulose carbamates (e.g. cellulose phenylcarbamate), cellulose ethers (e.g. alkylcelluloses, benzylcellulose, hydroxyalkylcelluloses, carboxymethylcellulose, cyanoethylcellulose, etc.).

Where necessary, the resin component may have been modified (e.g. rubber-modified).

The preferred thermoplastic resins include olefinic resins, (meth)acrylic resins, styrenic resins, polyester-series resins, polyamide-series resins and polycarbonate-series resins, among others. Moreover, the transparent resin constituting the continuous phase and dispersed phase may be crystalline or noncrystalline. In the preferred embodiment, a crystalline resin and a noncrystalline resin can be used in combination. Thus, either one (for example, the continuous phase) of the continuous phase and dispersed phase (discontinuous phase) may be made of a crystalline resin and the other one (for example, dispersed phase) of the phases be made of a noncrystalline resin.

The crystalline resin which can be used includes olefinic resins (polypropylene-series resin with a propylene content of not less than 90 mole %, such as polypropylene, propylene-ethylene copolymer, etc., poly(methylpentene-1), etc.), vinylidene-series resins (e.g. vinylidene chloride-series resin), aromatic polyester-series resins (e.g. polyalkylene arylate homopolyesters such as polyalkylene terephthalates, polyalkylene naphthalates, etc., copolyesters containing not less than 80 mole % of an alkylene arylate unit, liquid-crystalline aromatic polyesters, etc.), and polyamide-series resins (e.g. aliphatic polyesters having short-chain segments, such as nylon 46, nylon 6, nylon 66, etc.). These crystalline resins can be used independently or in a combination of two or more species.

The degree of crystallization of the crystalline resin (e.g. a crystalline polypropylene-series resin) may for example be about 10 to 80%, preferably about 20 to 70%, and more preferably about 30 to 60%.

The noncrystalline resin which can be used includes but is not limited to vinyl-series polymers (homo- or copolymers of vinyl-series monomers such as monomers, ethylene-vinyl acetate copolymer, ethylene-(meth)acrylic ester copolymers, polyvinyl chloride, vinyl chloride-vinyl acetate copolymer, poly(vinyl acetate), vinyl alcohol-series resin, etc.), (meth) acrylic resins (e.g. poly(methyl methacrylate), methyl methacrylate-styrene copolymer (MS resin), etc.), styrenic resins (polystyrene, styrene-diene-series copolymer such as SB resin or SBS resin, AS resin, styrene-methyl methacrylate copolymer, etc.), polycarbonate-series polymers, noncrystalline polyester-series resins (aliphatic polyesters, polyalkylene arylate copolyesters whose diol component and/or aromatic dicarboxylic acid component has been partially substituted, polyarylate resins, etc.), polyamide-series resins (e.g. aliphatic polyamides having long-chain segments and noncrystalline aromatic polyamides), and thermoplastic elastomers (e.g. polyester elastomers, polyolefin elastomers, polyamide elastomers, styrenic elastomers, etc.). Referring to the noncrystalline polyester-series resins, the polyalkylene arylate copolyester includes copolyesters obtainable by using at least one member selected from (poly)oxyalkylene glycol (e.g. diethylene glycol, triethylene glycol), cyclohexanedimethanol, phthalic acid, isophthalic acid and aliphatic dicarboxylic acids (e.g. adipic acid) as part (e.g. about 10 to 80 mole %, preferably about 20 to 80 mole %, and more preferably about 30 to 75 mole %) of the diol component ($C_{2-4}$alkylene glycol) and/or aromatic dicarboxylic acid component (terephthalic acid, naphthalenedicarboxylic acid). These noncrystalline resins can be used independently or in a combination of two or more species.

As the first transparent resin constituting the continuous phase, usually a transparent and highly heat-stable resin is used. The preferred first transparent resin is a crystalline resin having high fluidity as a melting property (that is, a resin showing large birefringence by stretching after melt-molding). The combination use of such a resin and the second transparent resin constituting the dispersed phase contributes to a homologous (uniform) compounding with the dispersed phase. Further, when a resin having a high melting point or glass transition point (particularly a high-melting crystalline resin) is used as the continuous phase-forming resin, its high heat stability and good film-forming properties allow the easy film-formation with melt-molding. As the first transparent resin, the polyester-series resin (in particular, polyalkylene arylate-series resin) is preferred, and, crystalline polyester-series resin having high heat stability (in particular, crystalline polyalkylene arylate-series resin such as crystalline polyethylene terephthalate resin) is particularly preferred.

As the second resin constituting the dispersed phase, usually a resin transforming easily at an orientation treatment temperature such as a monoaxial stretching temperature and having practical heat stability is employed. In particular, when a resin having a lower melting point or glass transition point than the continuous phase is used as the resin constituting the dispersed phase, the aspect ratio of dispersed phase particles can be easily increased by an orientation treatment such as monoaxial stretching. Incidentally, the melting point or glass transition point of the dispersed phase-forming resin is lower than that of the resin constituting the continuous phase in many instances, and may for example be about 50 to 180° C., preferably about 60 to 170° C., and more preferably about 70 to 150° C.

The dispersed phase is bonded to the continuous phase without substantially generating a void in an interface with the continuous phase. The embodiments of bond between the continuous phase and the dispersed phase can be mainly classified into one in which the dispersed phase is directly bonded to the continuous phase, and one in which the dispersed phase is bonded to the continuous phase through (or through the intermediary of) the compatibilizing agent.

The embodiment in which the dispersed phase is directly bonded to the continuous phase includes (1) one in which end groups and/or side chains in the resins constituting the continuous phase and the dispersed phase are reacted with each other to form a chemical bond, and (2) one in which the resins constituting the continuous phase and the dispersed phase are exchange-reacted in the molecular chain thereof to form a chemical bond, such as transesterification. In the case where the phase has no functional groups showing chemical reactivity, it is necessary that the phase at least has an end group or a side chain reactive to the functional group.

In the case of containing no compatibilizing agents, the second transparent resin can be selected according to a kind (species) of a functional group of the first transparent resin. For instance, when the first transparent resin has a carboxyl group as a functional group, it is preferred that the second transparent resin has a functional group reactive to the carboxyl group, such as a hydroxyl group, an amino group, an epoxy group and others. Moreover, when the first transparent resin has a hydroxyl group, it is preferred that the second transparent resin has a functional group reactive to the hydroxyl group, such as carboxyl group, an acid anhydride group, an isocyanate group and others. Further, when the first transparent resin has an amino group, preferably the second transparent resin has a functional group reactive to the amino group, such as a carboxyl group, an anhydride group, an epoxy group and others.

Specifically, when the first transparent resin is a polyester-series resin, the first transparent resin usually has a carboxyl group and/or a hydroxyl group. Therefore, as the second transparent resin, a transparent resin having a functional group reactive to the (these) group(s) is preferred (e.g., epoxidized styrene-diene-series copolymers, polyamide-series resins, anhydrous carboxylic acid-modified polyolefinic-series resins, polyester-series resins, polyurethane-series resins and the like). Among them, it is preferred that the first transparent resin is a crystalline polyester-series resin, and the second transparent resin is a styrene-diene-series copolymer having an epoxy group in a main chain thereof (e.g., epoxidized styrene-diene-series copolymers such as epoxidized styrene-butadiene-styrene block copolymer and epoxidized styrene-butadiene copolymer, and the like). The concentration (amount) of the carboxyl group in the crystalline polyester-series resin is usually about 0 to 300 mili-equivalent/kg (e.g., about 5 to 300 mili-equivalent/kg), and preferably about 10 to 200 mili-equivalent/kg. The concentration (amount) of the hydroxyl group in the crystalline polyester-series resin is usually about 0 to 300 mili-equivalent/kg (e.g., about 5 to 300 mili-equivalent/kg), and preferably about 5 to 200 mili-equivalent/kg. On the contrary, the epoxy equivalent (JIS K7236) of the epoxidized styrene-diene-series copolymer may for example be about 300 to 1000, preferably about 500 to 900, and more preferably about 600 to 800. From the viewpoint of a balance of formability of the sheet and reactivity, it is preferred that an epoxy group is comprised in a main chain of the resin rather than a side chain thereof.

In the embodiment in which the dispersed phase is bonded to the continuous phase through the compatibilizing agent, such a compatibilizing agent as containing a functional group having chemical reactivity is employed. It is preferred that in at least one of the continuous phase and the dispersed phase, an end group or a side chain thereof is reacted with the functional group of the compatibilizing agent, and the other phase at least has affinity with the compatibilizing agent.

In the case of containing the compatibilizing agent, the second transparent resin can be selected without considering adhesiveness with the first transparent resin, because the second transparent resin is bonded to the interface of the first transparent resin through the compatibilizing agent. As the compatibilizing agent, a compatibilizing agent containing a functional group having reactivity with both of the first and the second transparent resins is preferably employed. A relation between the functional group of the compatibilizing agent and the functional group of the first and the second transparent resins is the same as the above-mentioned relation between the functional group of the first transparent resin and that of the second transparent resin. Therefore, the second transparent resin includes transparent resins excellent in a balance of a reactivity with the compatibilizing agent, heat denaturation and heat stability, such as polystyrenic resin, styrene-diene-series copolymer, polyamide-series resin and others. Among the second transparent resins, polystyrene, a styrene-diene-series block copolymer, an aromatic polyamide-series resin and the like are particularly preferred. Since the polystyrenic resin has high refractive index and transparency, and has excellent in heat resistance, because of having high glass transition temperature such as about 100 to 130° C. The styrene-diene-series copolymer has relatively high softening temperature, and is capable of modifying easily at the stretching temperature. The styrene-diene-series copolymer includes styrene-butadiene-styrene block copolymer (SBS resin) and styrene-butadiene block copolymer (SB resin), and others. The aromatic polyamide-series resin such as MXD-6 is a crystalline resin, and then the resin is excellent in heat resistance. The concentration (amount) of the amino group in the aromatic polyamide-series resin is usually about 0 to 300 mili-equivalent/kg (e.g., about 5 to 300 mili-equivalent/kg), and preferably about 10 to 200 mili-equivalent/kg.

The compatibilizing agent can be selected from the conventional compatibilizing agents according to the species of the continuous phase and the dispersed phase and, for example, modified resins as modified with oxazoline compounds or modifying groups (carboxyl, acid anhydride, epoxy, oxazolinyl and other groups), diene-series copolymers (random and other copolymers) obtainable by copolymerization with diene or rubber-containing polymers [e.g. homo- or copolymers of diene-series monomers or copolymerizable monomers (aromatic vinyl monomers etc.); diene-series graft copolymers such as acrylonitrile-butadiene-styrene copolymer (ABS resin); diene block copolymers such as styrene-butadiene (SB) block copolymer, hydrogenated styrene-butadiene (SB) block copolymer, hydrogenated styrene-butadiene-styrene block copolymer (SEBS), hydrogenated (styrene-ethylene/butylene-styrene) block copolymer, etc. and their hydrogenation versions etc.], and diene or rubber-containing polymers modified with the modifying groups (epoxy and other groups). These compatibilizing agents can be used independently or in a combination of two or more species.

As the compatibilizing agent, a polymer (a random, block or graft copolymer) having the same components as, or components in common with, the polymer blend constituent resins, or a polymer (a random, block or graft copolymer) having an affinity for the polymer blend constituent resins is employed.

The diene-series monomer includes conjugated dienes such as $C_{4-20}$ conjugated dienes which may optionally be substituted, e.g. butadiene, isoprene, 1,3-pentadiene, 2,3-dimethyl-1,3-butadiene, piperylene, 3-butyl-1,3-octadiene, phenyl-1,3-butadiene, etc. The conjugated dienes can be used independently or in a combination of two or more species. Among these conjugated dienes, butadiene and isoprene are preferred.

The aromatic vinyl monomer includes but is not limited to styrene, a-methylstyrene, vinyltoluenes (p-methylstyrene etc.), p-t-butylstyrene, divinylbenzenes and 1,1-diphenylstyrene. Among these aromatic vinyl monomers, styrene is preferred. These monomers can be used independently or in a suitable combination of two or more species.

The modification mentioned above can be made by copolymerizing a monomer corresponding to the modifying group (e.g. a carboxyl group-containing monomer such as (meth)acrylic acid for carboxyl-modification, maleic anhydride for acid anhydride-modification, a (meth)acrylic monomer for ester-modification, a maleimide-series monomer for maleimide-modification, and an epoxy group-containing monomer such as glycidyl (meth)acrylate for epoxy-modification). Preferably, the epoxy-modification may be made by epoxidization of an unsaturated double bond.

The preferred compatibilizing agent is one having an epoxy group in a main chain thereof, particularly an epoxy-modified aromatic vinyl-diene-series block copolymer (e.g. an epoxidized styrene-diene-series copolymer or an epoxy-modified styrene-diene-series copolymer such as epoxidized styrene-butadiene-styrene (SBS) block copolymer or epoxidized styrene-butadiene (SB) block copolymer). The epoxidized aromatic vinyl-diene series copolymer is not only highly transparent but has a comparatively high softening point of about 70° C., and is capable of compatibilizing resins in many combinations of continuous and dispersed phases to disperse the dispersed phase uniformly.

The block copolymer mentioned above can be constituted of a conjugated diene block or the corresponding partially hydrogenated block and an aromatic vinyl block. In the epoxidized diene-series block copolymer, the double bonds in the conjugated diene blocks may have been partly or completely epoxidized.

The ratio (weight ratio) of the aromatic vinyl block relative to the conjugated diene block (or the corresponding hydrogenated block) may for example be [former/latter] =about 5/95 to 80/20 (e.g. about 25/75 to 80/20), more preferably about 10/90 to 70/30 (e.g. about 30/70 to 70/30), and usually about 50/50 to 80/20.

Moreover, the epoxidized aromatic vinyl-diene-series block copolymer with an aromatic vinyl block (e.g. styrene block) content of about 60 to 80 weight % has a refractive index which is comparatively high (e.g. about 1.57) and close to the refractive index of the dispersoid resin (e.g. a noncrystalline copolyester) so that the dispersoid resin can be caused to be uniformly dispersed while the light scattering performance of the dispersoid resin is maintained.

The number average molecular weight of the block copolymer can be selected from the range of, for example, about 5,000 to 1,000,000, preferably about 7,000 to 900,000, and still more preferably about 10,000 to 800,000. The molecular weight distribution [the ratio [Mw/Mn] of weight average molecular weight (Mw) relative to number average molecular weight (Mn)] may for example be not more than 10 (about 1 to 10), and preferably about 1 to 5.

The molecular structure of the block copolymer may be linear (straight), branched, radial or any combination thereof. The block structure of the block copolymer may for example be a monoblock structure, a multiblock structure such as a tereblock structure, a trichain-radial tereblock structure or tetrachain-radial tereblock structure. Such block structures may for example be written as X-Y, X-Y-X, Y-X-Y, Y-X-Y-X, X-Y-X-Y, X-Y-X-Y-X, Y-X-Y-X-Y, $(X-Y-)_4Si$, $(Y-X-)_4Si$, etc. where X represents an aromatic diene block and Y represents a conjugated diene block.

The ratio of epoxy groups in the epoxidized diene-series block copolymer is not particularly restricted but, in terms of oxygen concentration of oxirane, may for example be about 0.1 to 8 weight %, preferably about 0.5 to 6 weight %, and more preferably about 1 to 5 weight %. The epoxy equivalent (JIS K7236) of the epoxidized diene-series block copolymer may for example be about 300 to 1,000, preferably about 500 to 900, more preferably about 600 to 800.

The epoxidized diene-series copolymer mentioned above can be produced by epoxidizing a diene-series block copolymer (or a partially hydrogenated block copolymer) which has been prepared by the conventional method. The epoxidization can be carried out in accordance with the conventional epoxidizing method, for example by epoxidizing the above-mentioned diene-series copolymer with an epoxidizing agent (e.g. a peracid, a hydroperoxide, etc.) in an inert solvent. The isolation and purification of the epoxidized diene-series copolymer can be carried out by a suitable method, for example the method which comprises precipitating the copolymer with a poor solvent, the method which comprises adding the copolymer to hot water under stirring and removing the solvent by distillation, or the direct desolventization method (direct desolvation method).

In the polarizing element of the present invention, the refractive index differential between the continuous phase and the dispersed phase on a linear polarized light in a stretched direction of the sheet is different from that in a direction perpendicular to the stretched direction. Therefore, the polarizing element has a property that a polarized light in a direction having smaller refractive index differential is almost transmittable and a polarized light in a direction having larger refractive index differential is scattered.

Concerning the refractive index differential, the absolute value of the refractive index differential between the continuous phase and the dispersed phase in the stretched direction is not less than 0.1 (e.g., about 0.1 to 0.5), preferably about 0.1 to 0.3, and more preferably about 0.1 to 0.2. The absolute value of the refractive index differential between the continuous phase and the dispersed phase in the direction perpendicular to the stretched direction is not more than 0.05, preferably not more than 0.04, and more preferably not more than 0.03.

In the polarizing element having the above-mentioned refractive index differential, the continuous phase and the dispersed phase comprise a component having about the same refractive index each other at the molding step. Generally, when the polarizing element is subjected to monoaxial stretching, the refractive index in the stretched direction of the continuous phase increases extremely, and that in the direction perpendicular to the stretched direction decreases slightly. On the contrary, even when the polarizing element is subjected to monoaxial stretching, the refractive index of the particulate dispersed phase is generally unchangeable. Therefore, by monoaxial stretching, the refractive index of the continuous phase is extremely different from that of the dispersed phase in the stretched direction, and the two refractive indexes almost agree with each other in the direction perpendicular to the stretched direction. Thereby, a polarizing element can be produced in which a polarized light in a direction having about the same refractive indexes in the continuous phase and the dispersed phase is almost transmitted (or transmittable) and a polarized light in a direction having different refractive indexes is scattered.

In the dispersed phase, the refractive index in the stretched direction is almost the same as that in the direction perpendicular to the stretched direction. On the other hand, the continuous phase shows the large birefringent by stretching, and it is preferred that the refractive index differential between the continuous phase and the dispersed phase in the stretched direction is largely different from that in the other direction.

In the transparent resins constituting the continuous phase and the dispersed phase, as the combination of the transparent resins satisfying such a refractive index differential and the above-mentioned chemical reactivity, for example, the following combinations are exemplified.

(1) a combination of a crystalline polyester-series resin (e.g., crystalline polyethylene terephthalate resin or crystalline polyethylene naphthalate-series resin) with an epoxidized styrene-diene-series copolymer having a refractive index close to that of the above polyester-series resin (e.g., epoxidized SBS resin or epoxidized SB resin), (2) a combination of a non-crystalline polyethylene terephthalate copolymer resin with an epoxidized styrene-diene-series copolymer having a refractive index close to that of the above resin (e.g., epoxidized SBS resin or epoxidized SB resin), and others.

The refractive index of the compatibilizing agent (e.g., epoxidized diene-series copolymer) may be almost the same as that of the second transparent resin constituting the dispersed phase (e.g., the refractive index differential between the compatibilizing agent and the second transparent resin is about 0 to 0.01, and preferably about 0 to 0.005).

The preferred combination of the transparent resins constituting the continuous phase and the dispersed phase with the compatibilizing agent includes one of the continuous phase comprising a crystalline polyester-series resin (e.g., crystalline polyethylene terephthalate-series resin, etc.) and the dispersed phase comprising SBS resin, SB resin, polystyrene, xylylenediamine adipate (MXD-6) and the like, with the compatibilizing agent comprising an epoxidized diene-series copolymer (e.g., epoxidized SBS resin, epoxidized SB resin, etc.), and the like.

Among the polarizing element having such a refractive index differential, a polarizing element having high total light transmittance in the direction perpendicular to the stretched direction and high the total light transmittance in the stretched direction, which affords light-diffusing properties and polarizing properties to a transmitted light, has similar properties to a transmission type (transmittable) polarizing plate. The total light transmittance in the direction perpendicular to the stretched direction is, for example, not less than 80% (e.g., about 80 to 99%) and preferably about 85 to 98%. The total light transmittance in the stretched direction is, for example, not less than 70% (e.g., about 70 to 95%) and preferably about 70 to 90%. Therefore, the polarizing element does not produce an increase in temperature depending on the absorption of one polarized light, which is a defect of the absorption type, and acts as a good scattered type polarizing plate similar to the transmittable polarizing plate.

A polarizing element, which imparts light-diffusing properties and polarizing properties to a transmitted light and a reflected light, in which the total light transmittance in the direction perpendicular to the stretched direction is not less than 80% (e.g., about 80 to 99%) and preferably about 85 to 98%, and the total light transmittance in the stretched direction is about 30 to 70% and preferably about 35 to 65%, can be used as a scattered type polarizing plate similar to the transmittable polarizing plate, and moreover shows similar properties to a reflection type polarizing plate. Therefore, such a polarizing element can be also used as a sheet for improving luminance of a liquid crystal display.

A polarizing element, which provides a reflected light with light-diffusing properties and polarizing properties, in which the total light transmittance in the direction perpendicular to the stretched direction is not less than 80% (e.g., about 80 to 99%) and preferably about 85 to 98%, and the total light transmittance in the stretched direction is not more than 30% (e.g., about 1 to 30%) and preferably about 5 to 25%, shows similar properties to a reflection type polarizing plate. Therefore, such a polarizing element can be also used as a sheet for improving luminance of a liquid crystal display.

In the polarizing element, an element, in which the parallel light transmittance (in particular, the parallel light transmittance in the stretched direction) is not more than 10% (e.g., about 1 to 10%) and preferably about 3 to 8%, acts as a particularly available scattered type polarizing plate similar to a transmission type- and reflection type-polarizing plate. Incidentally, the parallel light transmittance refers to a transmittance of a light transmitted through a sheet (or a polarizing element) linearly, without refracting or scattering a light transmitted through the continuous phase by the dispersed phase.

The mean diameter in a major or longitudinal axial direction of the dispersed phase is about 0.8 to 10 μm, preferably about 1 to 5 μm, and more preferably about 1.5 to 3 μm. The mean size in a minor axial direction of the dispersed phase is about 0.05 to 0.8 μm, preferably about 0.1 to 0.5 μm, and more preferably about 0.2 to 0.4 μm. The mean aspect ratio of the dispersed phase is about 2 to 1,000, preferably about 3 to 500, and more preferably about 5 to 100 (in particular, about 7 to 30). The morphology of the dispersed phase becomes spherical to rugby ball-like form by separating the phase from the continuous phase in stretching. For example, the mean diameter of the dispersed phase before orientation by stretching may be about 0.3 to 3 μm.

The higher orientation coefficient as alignment degree of the particles constituting the dispersed phase is more preferably, and the orientation coefficient may, for example, be not less than 0.6 (about 0.34 to 1), preferably about 0.7 to 1, and more preferably about 0.8 to 1. The higher the orientation coefficient is, the higher anisotropy is imparted to scattered light.

The orientation coefficient can be calculated by means of the following equation.

Orientation coefficient=$(3<\cos^2 \theta>-1)/2$ where θ represents the angle between the major axis of the particulate dispersed phase and the X-axis of the film or sheet (when the major axis is parallel to the X-axis, θ=0°); $<\cos^2 \theta>$ represents the average of $\cos^2 \theta$ values found for individual dispersed phase particles and can be expressed as follows.

$<\cos^2 \theta> = \int n(\theta) \cdot \cos^2 \theta \cdot d\theta$ (wherein n(θ) represents the percentage (weight percent) of dispersed phase particles having the angle θ in the total population of dispersed phase particles.) The ratio of the continuous phase relative to the dispersed phase (weight ratio) can be selected from the range of, for example, [continuous phase/dispersed phase (weight ratio)]=about 99/1 to 30/70 (e.g., about 95/5 to 40/60), preferably about 99/1 to 50/50 (e.g., about 95/5 to 50/50), and more preferably about 98/2 to 60/40 (e.g., about 90/10 to 60/40), with reference to the kinds, melt viscosity and light diffusing properties of the resins, and usually about 99/1 to 75/25 (about 80/20 to 60/40).

The ratio of the dispersed phase relative to the compatibilizing agent (weight ratio) can be selected from dispersed phase/compatibilizing agent (weight ratio)=about 99/1 to 50/50, preferably about 99/1 to 70/30, and more preferably about 98/2 to 80/20.

The amount of the compatibilizing agent is, for example, about 0.1 to 20 parts by weight, preferably about 0.5 to 15 parts by weight, and more preferably about 1 to 10 parts by weight, relative to the total 100 parts by weight of the continuous phase and the dispersed phase.

When each component is used in such ratios, the dispersed phase can be uniformly dispersed even if pellets of each components are directly melt-kneaded together without compounding the components in advance with avoiding the formation of voids on orientation treatment, e.g. monoaxial stretching, and an excellent polarizing element can be obtained.

More specifically, for example, the following resin composition can be compounded readily, and the melt-molding can be carried out with compounding the raw materials only by feeding them, and the formation of voids can be prevented even when monoaxial stretching is carried out, as a result, a good (high performance) polarizing element can be obtained:

(a) a resin composition comprising a crystalline polyethylene terephthalate resin as the continuous phase, a SBS resin as the dispersed phase, and an epoxidized SBS resin as the compatibilizing agent, in which a ratio of the continuous phase relative to the dispersed phase is 99/1 to 50/50 (particularly, 80/20 to 60/40) (weight ratio) and a ratio of the dispersed phase relative to the compatibilizing agent is 99/1 to 50/50 (particularly, 98/2 to 80/20) (weight ratio);

(b) a resin composition comprising a crystalline polyethylene terephthalate resin as the continuous phase, a polystyrene as the dispersed phase, and an epoxidized SBS as the compatibilizing agent, in which a ratio of the continuous phase relative to the dispersed phase is 99/1 to 50/50 (particularly, 90/10 to 70/30) (weight ratio) and a ratio of the dispersed phase relative to the compatibilizing agent is 99/1 to 50/50 (particularly, 99.5/0.5 to 90/10) (weight ratio), and (c) a resin composition comprising a crystalline polyethylene terephthalate resin as the continuous phase, MXD-6 as the dispersed phase, and an epoxidized SBS as the compatibilizing agent, in which a ratio of the continuous phase relative to the dispersed phase is 99/1 to 50/50 (particularly, 90/10 to 70/30) (weight ratio) and a ratio of the dispersed phase relative to the compatibilizing agent is 99/1 to 50/50 (particularly, 99.5/0.5 to 90/10) (weight ratio).

The polarizing element of the present invention may contain the conventional additives, for example stabilizers such as an antioxidant and a heat stabilizer, a plasticizer, an antistatic agent, a flame retardant, a filler, an ultraviolet absorber, and the others.

The thickness of the polarizing element of the present invention is about 3 to 300 μm, preferably about 5 to 200 μm (e.g., about 30 to 200 μm), and more preferably about 5 to 100 μm (e.g., about 50 to 100 μm).

The polarizing element of the present invention may be a monolayered film, or may be a laminated film in which a transparent resin layer without detriment to the optical properties is laminated on at least one side (particularly, both sides) of the polarizing element. When the polarizing element is protected by the transparent resin layer, the dispersed phase particle can be prevented from falling out or sticking, flaw resistance of the polarizing element or stability in the polarizing element-producing process can be improved, and strength or handling of the polarizing element can be improved.

The resin constituting the transparent resin layer can be selected from the resins exemplified as the resins constituting the continuous phase or the dispersed phase. It is preferred that the transparent resin layer is composed of the same kind of resins (in particular, the same resin) as one constituting the continuous phase.

The preferred transparent resin for enhancing heat resistance or blocking resistance includes a resin having heat resistance (e.g. a resin having high glass transition temperature or melting point), a crystalline resin and the like. The glass transition temperature or melting point of the resin constituting the transparent resin layer may be similar to that of the resin constituting the continuous phase, and may be, for example, about 130 to 280° C., preferably about 140 to 270° C., and more preferably about 150 to 260° C.

The total thickness of the transparent resin layer may for example be the same degree as that of the polarizing element. In particular, when the thickness of the polarizing element layer is about 3 to 300 $\mu$m, the thickness of the transparent resin layer can be selected from the range of about 3 to 150 $\mu$m, preferably about 5 to 50 $\mu$m and more preferably about 5 to 15 $\mu$m.

The thickness ratio of the polarizing element relative to total thickness of the transparent resin layer(s) may, for example, be selected from the polarizing element/the transparent resin layer=about 5/95 to 99/1, and is usually 50/50 to 99/1, and preferably about 70/30 to 95/5. The thickness of the laminated film is, for example, about 6 to 600 $\mu$m, preferably about 10 to 400 $\mu$m, and more preferably about 20 to 250 $\mu$m.

On the surface of the polarizing element, the releasing agent such as silicone oil may be applied or the treatment by corona discharge may be given or applied, as far as the optical properties of the polarizing element is not deteriorated. Incidentally, the polarizing element may be formed with surface irregularities of the film. When such surface irregularities are provided, an anti-dazzling can be imparted to the polarizing element.

[Process for Producing the Polarizing Element]

The polarizing element can be obtained by dispersing and orienting a dispersed phase-forming second component in a continuous phase-forming first resin. For example, blending the first transparent resin, the second transparent resin and optionally the compatibilizing agent in the conventional manner (e.g. melt-blending method, tumbler method, etc.) where necessary, melt-mixing them, and extruding the mixture from a T-die, a ring die, or the like into a film form, the dispersed phase can be dispersed in the continuous phase. The preferred melting temperature is not lower than the melting points of the first and the second transparent resins, and the melting temperature is for example about 150 to 290° C., and preferably about 200 to 260° C. though the temperature varies according to the kinds of transparent resins.

Next, the orientation of the dispersed phase can be achieved by, for example, (1) the method comprising stretching the extruded sheet, (2) the method comprising giving a draft (or draw) to harden the sheet in the course of extrusion, and then stretching the sheet, and others. In order to express the excellent properties of the polarizing element of the present invention, it is preferred that the process comprising hardening a sheet, in which the dispersed phase (transparent resin) is dispersed in the form of a particle in the continuous phase (transparent resin), by the above-mentioned melt-molding, and then stretching the sheet to orient.

By stretching the sheet to orient, a structure can be formed in which the refractive index differential between the continuous phase and the dispersed phase on a linear polarized light in a stretched direction of the sheet is different from that in a direction perpendicular to the stretched direction. Further, thus obtained stretched sheet has properties that a polarized light in a direction having smaller refractive index differential is almost transmittable and a polarized light in a direction having larger refractive index differential is scattered.

The method for stretching may be simple monoaxial stretching having free width, or monoaxial stretching having a constant width. The method for monoaxial stretching is not particularly restricted but includes the method in which both ends of a solidified film are pulled in opposite directions (pull stretching), the method using two or more pairs of opposed rollers (2-roll sets) arranged serially (e.g. in a series of 2 pairs) wherein the film is passed over the rollers constituting each roll set by guiding it through the respective roll nips and stretched by driving the 2-roll set on the pay-out side at a speed higher than the speed of the 2-roll set on the feed side (inter-roll stretching), and the method in which the film is passed through the nip of a pair of opposed rollers and stretched under the roll pressure (roll calendering).

The preferred monoaxial stretching technology includes methods which facilitate the mass production of film, such as inter-roll stretching and roll-calendering. These methods are utilized as a first stretching step for producing a biaxial stretched film or a method for producing a phase film. Particularly, by roll calender method, not only a noncrystalline resin but also a crystalline resin can be easily stretched. Thus, when a resin sheet is stretched monoaxially, usually the trouble of "neck-in", the phenomenon of local reduction in the thickness and width of the film, tends to occur. In the roll calender method, however, the trouble of "neck-in" can be precluded so that the film stretching operation is stabilized. Since there is no change (reduction) in film width before and after stretching and the film thickness in the transverse direction can be made uniform so that the polarizing characteristic can be uniformized in the transverse direction of the film, the quality assurance of the product be facilitated, and the useful rate (yield) of the film be improved. Furthermore, the stretching factor can be freely selected from a broad range. In addition, in roll calendering method, wherein the film width can be maintained before and after stretching, the reciprocal of the rate of reduction in film thickness is approximately equal to the stretching factor.

The roll pressure for roll calendering may for example be about $1 \times 10^4$ to $1 \times 10^7$ N/m (about 0.01 to 10 t/cm), and preferably about $1 \times 10^5$ to $1 \times 10^7$ N/m (about 0.1 to 10 t/cm).

The stretching factor can be selected from a broad range and may for example be about 1.1 to 10, preferably about 1.3 to 5, more preferably about 1.5 to 3. The roll calendering can be carried out at a thickness reduction rate (draft) of about 0.9 to 0.1, preferably about 0.77 to 0.2, more preferably about 0.67 to 0.33.

The stretching temperature is not particularly restricted inasmuch as the film can be stretched and may be over the melting point or glass transition temperature of the second transparent resin constituting the dispersed phase. Moreover, when a resin having a glass transition temperature (Tg) or melting point higher than that of the second transparent resin (for example, a resin having a Tg or melting point higher by about 5 to 200° C., preferably about 5 to 100° C.) is used as the first transparent resin constituting the continuous phase and the film is monoaxially stretched while the second transparent resin is melted or softened, the aspect ratio of the dispersed phase particles can be increased and an excellent polarizing element can be obtained because the second transparent resin constituting the dispersed phase is by far readily deformed as compared with the first transparent resin constituting the continuous phase. The preferred stretching temperature may for example be about 50 to 200° C. (particularly, about 70 to 180° C.). In case the first transparent resin is a noncrystalline resin, the calender roll temperature may be below the melting point of the resin or in the neighborhood of the melting point, and may be a temperature below the glass transition point and in the neighborhood of the glass transition point.

Moreover, in case the first transparent resin constituting the continuous phase is a crystalline polyester-series resin, it is preferred that the crystalline resin is cooled at almost non-crystalline state, and then is subjected to monoaxial stretching at a temperature about 30 to 120° C. (particularly about 50 to 100° C.) lower than the crystalline temperature. The monoaxially stretched sheet shows the preferable diffusing-polarizing properties. In order to improve the heat resistance of the sheet, it is preferred that the sheet is subjected to heat treatment in almost fixed-length at a temperature not less than the crystalline temperature to crystallize the sheet. In the case of being subjected to such a treatment, the sheet is kept or improved the diffusing-polarizing properties without blanching. Moreover, the sheet can be improved the heat stability or moisture resistance so that the sheet can be utilized as parts of a liquid crystal display apparatus and the like.

Incidentally, the above-mentioned laminated film can be obtained by using a conventional method such as a co-extrusion and a lamination (e.g., a lamination by extruding, a lamination with adhesiveness) which comprises laminating the transparent resin layer on at least one side of the polarizing element layer and orientating the dispersed phase particle by the orientation-treatment in the same manner as mentioned above.

When the monoaxial stretching temperature of the polarizing element of the invention is low and the element is utilized in need of heat resistance, heat resistance can be afforded to the polarizing element of the invention while keeping the polarizing properties by heat treatment with retaining the length of the sheet at a temperature higher than the stretching temperature.

[Plane or Flat Light Source Unit and Transmittable Liquid Crystal Display Apparatus]

The plane or flat light source unit of the present invention comprises a tubular light source (e.g., a fluorescent tube), a light guide member and a polarizing element, in which the light guide member is used for being incident a light from (or of) the tubular light source on the lateral side and emerging from a flat emerge surface, and the polarizing element is disposed at or on a light-emerging side of the light guide member. In the plane or flat light source unit, the polarizing element is used as a scattered type element.

Figure 3:
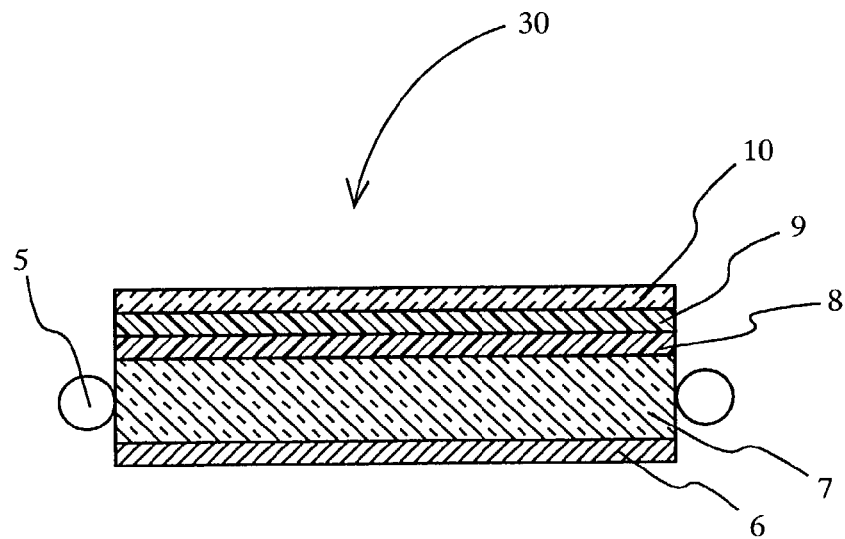
FIG. 3 is a schematic sectional view showing an embodiment of the transmittable liquid crystal display apparatus using the plane or flat light source unit of the present invention.

FIG. 3 is a schematic sectional view showing an embodiment of the transmittable liquid crystal display apparatus using the plane or flat light source, which is improved luminance with use of the polarizing element of the present invention. A liquid crystal display apparatus 30 comprises a fluorescent tube 5 as the tubular light source, a light guide member (light guide) 7, a TN-type liquid crystal cell 10, a reflection member (reflector) 6, a polarizing element 8 and a diffusing or scattering sheet 9, in which the light guide member 7 is disposed at or on the lateral side of the fluorescent tube 5 and is used for incident a light from the fluorescent tube 5 on the lateral side and emerging from a flat emerge surface, the liquid crystal cell 10 is illuminated by a light emerged from the light guide 7, the reflector 6 is used for reflecting the incident light, the element 8 is disposed between the light guide 7 and the liquid crystal cell 10, and the diffusing or scattering sheet 9 is used for diffusing the light transmitted through the polarizing element.

In the liquid crystal display apparatus 30, the light from the fluorescent tube 5 is transmitted through the light guide 7, reflected by the reflector 6, and emerged from the light guide 7. Concerning the emerged light, in the polarizing element 8, a polarized light in a direction having smaller refractive index differential between the continuous phase and the dispersed phase is almost transmitted, and a polarized light in a direction having larger refractive index differential between them is scattered, and transmitted or reflected,.

The reflected light is transmitted through the light guide 7 again and reflected by the reflector 6. By the reflection, a light partially spun 90° in the polarized direction is generated. The spun light in the polarized direction is transmitted through the light guide 7 again and reached to the polarizing element 8 to transmit. The unchanged light in the polarized direction is reflected by the polarizing element 8 again, however by the reflection at the reflector 6, a light spun 90° in the polarized direction again is transmitted through the polarizing element 8. The light transmitted through the polarizing element 8 is scattered by the diffusing or scattering sheet 9, and illuminates the liquid crystal cell 10.

Accordingly, most light from the fluorescent tube 5, whose polarizing light axes are almost corresponding, is emerged from the polarizing element 8. Therefore, if the polarizing axis of an absorption type polarizing plate (not shown) in the incident side of the liquid crystal cell 10 is corresponding to the above-mentioned axes, the light from the fluorescent tube 5 utilized only about 50% in the conventional manner can be utilized in better efficiency.

The polarizing element of the present invention used in this application is preferably used in a transmittable liquid crystal display apparatus having the reflective, diffusing and polarizing properties in which the total light transmittance in a direction having smaller refractive index differential between the continuous phase and the dispersed phase is not less than 80%, and the total light transmittance in a direction having larger refractive index differential between the continuous phase and the dispersed phase is about 30 to 70% (preferably not more than 30%). The effect of luminance improvement in the polarizer of the invention is demonstrated even when the polarizer is laminated on an ordinary used optical member such as a light guide, a diffusing plate, a prism sheet, or a combination thereof.

[Reflection Type Liquid Crystal Display Apparatus]

The reflection type liquid crystal display apparatus of the present invention may comprise a liquid crystal cell which is disposed between the polarizing element of the invention and the reflector, or may comprise the polarizing element of the invention which is disposed between the liquid crystal cell and the reflector. Among these apparatuses, a reflection type liquid crystal display apparatus comprising the polarizing element which is disposed between the liquid crystal cell and the reflector is preferred.

Figure 4:
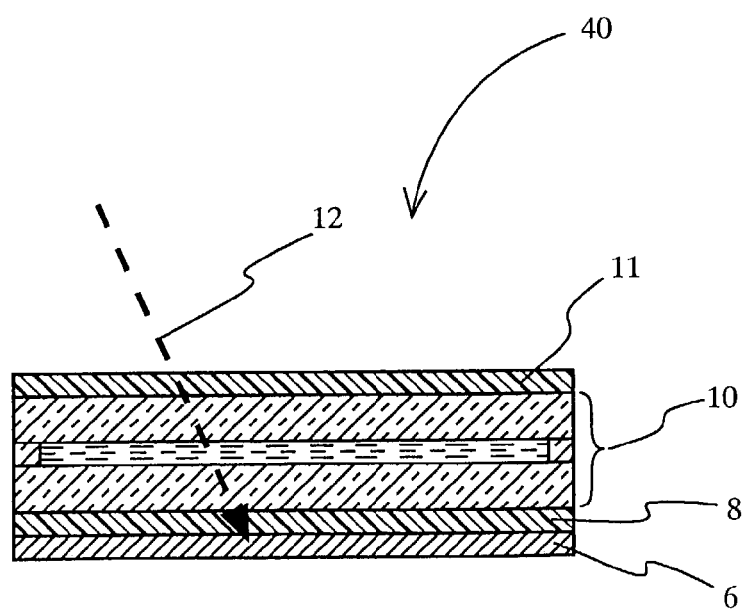
FIG. 4 is a schematic sectional view showing an embodiment of the reflection type liquid crystal display apparatus of the present invention.

FIG. 4 is a schematic sectional view showing an embodiment of the reflection type liquid crystal display apparatus which is improved luminance by using the polarizing element of the present invention. A reflection type liquid crystal display apparatus 40 comprises a reflection member (reflector) 6 for reflecting outside light 12, a TN-type liquid crystal cell 10 (for a reflection type liquid crystal display apparatus), an absorption type polarizing plate 11, and a polarizing element 8, in which the liquid crystal cell 10 is illuminated by an emerged light from the reflector 6, the polarizing plate 11 is used for guiding the outside light 12 to the liquid crystal cell 10, and the polarizing element 8 is disposed between the reflector 6 and the liquid crystal cell 10 and used for scattering the emerged light from the reflector 6.

In the reflection type liquid crystal display apparatus 40, out of the outside light 12 incident on the absorption type polarizing plate 11, only a light whose polarizing axis (axial direction) corresponds with the polarizing axis (axial direction) of the polarizing plate is transmitted and reaches to the liquid crystal cell 10. The light incident on the liquid crystal cell 10 spins the polarizing direction to reach to the polarizing element 8.

In the case of making a display of the liquid crystal cell into a dark display, the polarizing element 8 is disposed in the manner as the polarizing direction of the outside light 12 transmitted through the liquid crystal cell 10 corresponds with a direction having smaller refractive index differential between the continuous phase and the dispersed phase of the polarizing element 8. The polarized light transmitted through the absorption type polarizing plate 11 is transmitted through the polarizing element 8 again, spun the polarizing direction in the liquid crystal cell 10, and oriented in a direction perpendicular to the polarizing axis of the absorption type polarizing plate 11, as a result the display of the liquid crystal cell becomes a dark display.

On the other hand, in the case of making the display of the liquid crystal cell into a bright display, the polarizing element 8 is disposed in the manner as the polarizing direction of the outside light 12 transmitted through the liquid crystal cell 10 corresponds with the direction having lager refractive index differential between the continuous phase and the dispersed phase of the polarizing element 8. Out of the outside light 12 incident on the absorption type polarizing plate 11, only a light whose polarizing axis (axial direction) corresponds with the polarizing axis (axial direction) of the polarizing plate 11 is transmitted through the liquid crystal cell 10, and reaches to the polarizing element 8 without spinning the polarizing direction in the liquid crystal cell 10. The polarized light incident on the polarizing element 8 is scattered in the reflection direction or the transmission direction. A light scattered in the transmission direction is reflected by the reflector 6, and incorporated with a light already scattered by the polarizing element 8 to reach to the absorption type polarizing plate 11, and is transmitted directly. Since the transmission light is scattered enough by the polarizer 8, the display shows good white display having low dependency on the visual angle.

Figure 5:
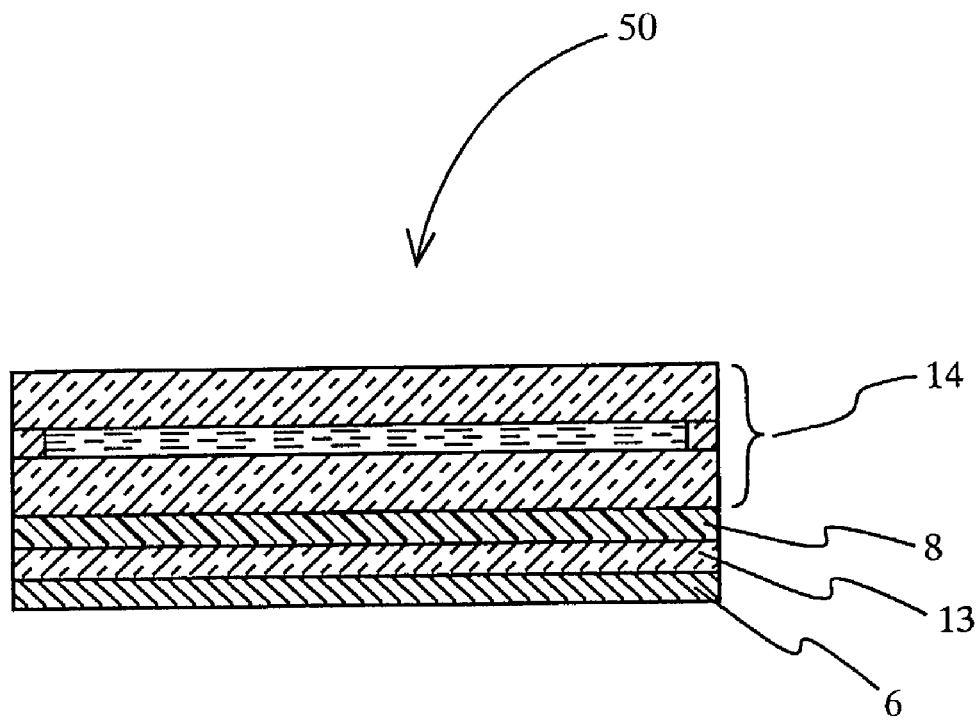
FIG. 5 is a schematic sectional view showing another embodiment of the reflection type liquid crystal display apparatus of the present invention.

FIG. 5 is a schematic sectional view showing another embodiment of the reflection type liquid crystal display apparatus which is improved luminance by using the polarizing element of the present invention. A reflection type liquid crystal display apparatus 50 comprises a liquid crystal cell 14 for a reflection type liquid crystal display apparatus, which is illuminated by the emerged light from the reflector 6, a reflection member (reflector) 6 for reflecting outside light, ¼ wavelength plate 13 which is disposed between the liquid crystal cell 14 and the reflector 6, and a polarizing element 8 which is disposed between the ¼ wavelength plate 13 and the liquid crystal cell 14 and used for scattering a light emerged from the reflector 6. Incidentally, the liquid crystal cell 14 is dichroic a dye-containing type liquid crystal.

In the reflection type liquid crystal display apparatus 50, the liquid crystal cell 14 is oriented to the direction of the orientation treatment of the liquid crystal (a direction parallel to a glass substrate of the liquid crystal cell) at a state without applied voltage, and a dichroic dye is also oriented in the same manner. Out of the outside light 12 incident on the liquid crystal cell 14, a linear polarizing component which is parallel to the major axis direction of the dichroic dye molecule is absorbed by the dichroic dye molecule. Moreover, a linear polarizing component perpendicular to the major axis direction of the dichroic dye molecule is transmitted through the liquid crystal cell 14, and is incident on the polarizing element 8. When the polarizing element 8 is disposed so that the passed linear polarizing direction corresponds with a direction having smaller refractive index differential between the continuous phase and the dispersed phase of the polarizing element 8, a polarized light emerged from the polarizing element 8 is turned into a circular polarized light by the ¼ wavelength plate (wave plate) 13. Further, the circular polarized light is reflected by the reflector 6, turns the direction, is incident on the ¼ wavelength plate 13 again, turns the direction of the original linear polarized light at an angle of 90°, and again, is incident on the polarizing element 8. The incident light is turned into a polarized light whose direction has larger refractive index differential between the continuous phase and the dispersed phase of the polarized element 8, is scattered as a linear polarized light parallel to the major axis of the dichroic dye molecule, and is absorbed in the liquid crystal cell 14 by the dichroic dye molecule, and as a result, the display of the liquid crystal cell 14 becomes a good black display.

On the other hand, the liquid crystal cell 14 is oriented to a direction perpendicular to the glass substrate at an energized state, and the dichroic dye is also oriented in the same manner. The incident outside light 12 is transmitted through the liquid crystal cell 14 without absorption by the dichroic dye of the liquid crystal cell 14, and is incident on the polarizing element 8. Out of the incident light, the polarized light whose direction has smaller refractive index differential between the continuous phase and the dispersed phase is transmitted directly in the polarizing element 8, but the polarized light whose direction is perpendicular to said direction is scattered. Next, the polarized light emerged from the polarizing element turns into a circular polarized light by the ¼ wavelength plate 13, and is reflected by the reflector 6. The reflected light, getting the direction of the circular polarized light inverted, is incident on the ¼ wavelength plate 13 again. Out of the incident light, the polarized light whose direction has smaller refractive index differential between the continuous phase and the dispersed phase is transmitted directly, and the polarized light turning into the circular polarized light turns at angle of 90° to be scattered by the polarizing element 8. Therefore, all light transmitted through the liquid crystal cell 14 containing the dichroic dye becomes scattered reflected-light, as a result good white display can be achieved.

Using the polarizing element of the present invention, high scattering properties and polarizing properties can be imparted to the transmission light and reflected light, and as a result, a liquid crystal display can be improved visibility. Particularly, even when a liquid crystal display is large in area, the display thereof is bright wholly. Therefore, a transmittable or reflection type liquid crystal display apparatus can be widely utilized in a display part of electronic products such as a personal computer, a word processor, a liquid crystal television, a cellular phone, a watch, an electronic calculator, and the like. In particular, it can be utilized as a liquid crystal display apparatus of potable information equipment preferably.

INDUSTRIAL APPLICABILITY OF THE INVENTION

According to the present invention, a polarizing element having excellent scattering properties and polarizing properties can be obtained by a simple method. Moreover, a uniform polarizing element can be obtained stably free from a void (aperture). Further, using the polarizing element of the invention, a plane or flat light source unit and a transmittable or reflection type liquid crystal display apparatus having high luminance can be obtained simply and inexpensively.

EXAMPLES

The following examples illustrate the present invention in further detail without defining the scope of the invention. Conditions of original sheets and stretched sheets produced in Examples and Comparative Examples, as well as measurement methods of polarizing elements produced in Examples and Comparative Examples are mentioned below.

[Original Sheets and Stretched Sheets of Examples and Comparative Examples]

Table 1 shows formulas, compounds and molding methods concerning production of original sheets of Examples and Comparative Examples. Table 2 shows monoaxial stretching and heat treatment conditions of the obtained original sheets. Tables 3 and 4 show shape of dispersed particles and anisotropy of refractive index. The shape of the dispersed particles were evaluated based on observation of cross section of the sheets by a transmittable electron microscope (TEM; dyeing with osmic acid).

TABLE 1

|  | Continuous phase | Dispersed phase | Compatibilizing agent | C | Molding method | T ($\mu$m) | S |
| --- | --- | --- | --- | --- | --- | --- | --- |
| Ex. 1 | PET1:70 | ESBS:30 | — | A | narrow-width | 400 | transparent |
| Com. Ex. 1 | PET1:70 | SBS:30 | — | B | press | 400 | transparent |
| Ex. 2 | PET1:70 | SBS:25 | ESBS:5 | A | narrow-width | 400 | transparent |
| Com. Ex. 2 | — | — | — | — | — | — | — |
| Com. Ex. 3 | PET1:70 | ESBS:30 | — | A | narrow-width | 400 | transparent |
| Ex. 3 | PET1:70 | ESBS:30 | — | A | narrow-width | 400 | transparent |
| Ex. 4 | PET1:70 | ESBS:30 | — | A | broad-width | 390 | transparent |
| Ex. 5 | PET1:70 | ESBS:30 | — | A | broad-width | 390 | transparent |
| Ex. 6 | PET1:70 | ESBS:30 | — | A | multi-layer | 440 | transparent |
| Ex. 7 | PET1:70 | MXD-6:25 | ESBS:5 | A | narrow-width | 400 | transparent |
| Com. Ex. 4 | PET1:70 | MXD-6:30 | — | B | press | 400 | transparent |
| Ex. 8 | PET1:70 | MXD-6:25 | ESBS:5 | A | narrow-width | 400 | transparent |
| Ex. 9 | PET1:70 | ESBS:30 | — | A | narrow-width | 200 | transparent |
| Ex. 10 | PET1:70 | ESBS:30 | — | A | narrow-width | 600 | transparent |
| Ex. 11 | PET1:70 | ESBS:30 | — | A | narrow-width | 400 | transparent |
| Com. Ex. 5 | PET1:70 | ESBS:30 | — | A | narrow-width | 400 | transparent |
| Ex. 12 | PET1:70 | ESBS:30 | — | A | narrow-width | 400 | transparent |
| Ex. 13 | PET1:70 | ESBS:30 | — | A | narrow-width | 400 | transparent |
| Ex. 14 | PET1:85 | ESBS:15 | — | A | narrow-width | 400 | transparent |
| Ex. 15 | PET1:55 | ESBS:45 | — | A | narrow-width | 400 | transparent |
| Com. Ex. 6 | PET1:55 | SBS:45 | — | B | press | 400 | transparent |
| Ex. 16 | PET2:70 | PS:25 | ESBS:5 | A | narrow-width | 400 | transparent |
| Com. Ex. 7 | PET2:70 | PS:30 | — | B | press | 400 | transparent |

The symbols in Table 1 are illustrated below.
C: compounding property (A: good, B: bad)
T: thickness of sheet (μm)
S: property of sheet
PET 1: crystalline polyethylene terephthalate resin, manufactured by Toyo Boseki Co. Ltd., LM565, IV (intrinsic viscosity) value 0.75
PET 2: crystalline polyethylene terephthalate resin, manufactured by Mitsubishi Chemical Co., GM330, IV value 0.65
ESBS: epoxidized diene-series block copolymer, manufactured by Daicel Chemical Industries, Ltd., Epofriend AT202; styrene/butadiene=70/30 (weight ratio), epoxy equivalent 750, refractive index about 1.57
SBS: SBS-series block copolymer, manufactured by Asahi kasei Co., Asaflex 810, styrene/butadiene=70/30 (weight ratio), refractive index 1.57
MXD-6: polyxylylenediamine diadipate resin, manufactured by Mitsubishi Gas Chemical Company, Inc., MX nylon N-MXD6
PS: polystyrene resin, manufactured by Grand Polymer Co., PS#30

TABLE 2

| | Monoaxial stretching | | | | |
|---|---|---|---|---|---|
| | Method | Temperature | Stretching Factor | Evaluation | Heat treatment |
| Ex. 1 | TE | 80° C. | x 4 | good | — |
| Com. Ex. 1 | TE | 80° C. | x 4 | blanching | — |
| Ex. 2 | TE | 80° C. | x 4 | good | — |
| Com. Ex. 2 | — | — | — | — | — |
| Com. Ex. 3 | TE | 130° C. | x 4 | breaking | — |
| Ex. 3 | TE | 80° C. | x 4 | good | 150° C., 2 min. |
| Ex. 4 | calendering | 80° C. | x 2 | good | — |
| Ex. 5 | calendering | 80° C. | x 2 | good | 150° C., 2 min. |
| Ex. 6 | calendering | 80° C. | x 2 | good | — |
| Ex. 7 | TE | 80° C. | x 4 | good | — |
| Com. Ex. 4 | TE | 80° C. | x 4 | blanching | — |
| Ex. 8 | TE | 80° C. | x 4 | good | 150° C., 2 min. |
| Ex. 9 | TE | 80° C. | x 4 | good | — |
| Ex. 10 | TE | 80° C. | x 4 | good | — |
| Ex. 11 | TE | 80° C. | x 3 | good | — |
| Com. Ex. 5 | TE | 80° C. | x 1.5 | non-uniformity | — |
| Ex. 12 | TE | 60° C. | x 4 | good | — |
| Ex. 13 | TE | 110° C. | x 4 | good | — |
| Ex. 14 | TE | 80° C. | x 4 | good | — |
| Ex. 15 | TE | 80° C. | x 4 | good | — |
| Com. Ex. 6 | TE | 80° C. | x 4 | blanching | — |
| Ex. 16 | TE | 80° C. | x 4 | good | — |
| Com. Ex. 7 | TE | 80° C. | x 4 | blanching | — |

In Table 2, "TE" means stretching by a tensile testing machine.

TABLE 3

| | Direction | S: Original sheet (μm) | S: Polarizing element (μm) | N: Continuous phase | N: Dispersed phase | ΔN |
|---|---|---|---|---|---|---|
| Ex. 1 | D para. | 0.5 | 2.0 | 1.705 | 1.569 | 0.136 |
| | D perp. | 0.5 | 0.25 | 1.556 | 1.568 | -0.012 |
| Com. Ex. 1 | D para. | 0.6 | 2.1 | — | — | — |
| | D perp. | 0.6 | 0.27 | — | — | — |
| Ex. 2 | D para. | 0.4 | 1.8 | 1.705 | 1.568 | 0.137 |
| | D perp. | 0.4 | 0.20 | 1.556 | 1.567 | -0.011 |
| Com. Ex. 2 | D para. | — | — | — | — | — |
| | D perp. | — | — | — | — | — |
| Com. Ex. 3 | D para. | 0.5 | — | — | — | — |
| | D perp. | 0.5 | — | — | — | — |
| Ex. 3 | D para. | 0.5 | 2.0 | 1.707 | 1.569 | 0.138 |
| | D perp. | 0.5 | 0.25 | 1.558 | 1.568 | -0.010 |
| Ex. 4 | D para. | 0.5 | 1.6 | 1.690 | 1.568 | 0.122 |
| | D perp. | 0.5 | 0.23 | 1.560 | 1.568 | -0.008 |
| Ex. 5 | D para. | 0.5 | 1.6 | 1.691 | 1.568 | 0.123 |
| | D perp. | 0.5 | 0.23 | 1.561 | 1.568 | -0.007 |
| Ex. 6 | D para. | 0.5 | 1.5 | 1.695 | 1.568 | 0.127 |
| | D perp. | 0.5 | 0.25 | 1.565 | 1.568 | -0.003 |
| Ex. 7 | D para. | 0.45 | 1.7 | 1.705 | 1.585 | 0.120 |
| | D perp. | 0.45 | 0.21 | 1.556 | 1.575 | -0.019 |
| Com. Ex. 4 | D para. | 0.45 | 2.0 | 1.705 | 1.585 | 0.120 |
| | D perp. | 0.45 | 0.28 | 1.556 | 1.575 | -0.019 |
| Ex. 8 | D para. | 0.45 | 1.7 | 1.707 | 1.585 | 0.122 |
| | D perp. | 0.45 | 0.21 | 1.558 | 1.575 | -0.017 |

TABLE 4

| | Direction | S: Original sheet (μm) | S: Polarizing element (μm) | N: Continuous phase | N: Dispersed phase | ΔN |
|---|---|---|---|---|---|---|
| Ex. 9 | D para. | 0.40 | 1.7 | 1.705 | 1.569 | 0.136 |
| | D perp. | 0.40 | 0.20 | 1.556 | 1.568 | −0.012 |
| Ex. 10 | D para. | 0.55 | 2.2 | 1.705 | 1.569 | 0.136 |
| | D perp. | 0.55 | 0.30 | 1.556 | 1.568 | 0.012 |
| Ex. 11 | D para. | 0.5 | 1.5 | 1.685 | 1.568 | 0.117 |
| | D perp. | 0.5 | 0.29 | 1.558 | 1.568 | −0.010 |
| Com. Ex. 5 | D para. | 0.5 | 0.9 | 1.650 | 1.568 | 0.082 |
| | D perp. | 0.5 | 0.4 | 1.610 | 1.568 | 0.042 |
| Ex. 12 | D para. | 0.5 | 2.1 | 1.715 | 1.571 | 0.144 |
| | D perp. | 0.5 | 0.24 | 1.545 | 1.565 | −0.020 |
| Ex. 13 | D para. | 0.5 | 1.9 | 1.700 | 1.568 | 0.132 |
| | D perp. | 0.5 | 0.26 | 1.560 | 1.568 | −0.008 |
| Ex. 14 | D para. | 0.25 | 1.0 | 1.705 | 1.569 | 0.136 |
| | D perp. | 0.25 | 0.13 | 1.556 | 1.568 | −0.012 |
| Ex. 15 | D para. | 0.75 | 3.0 | 1.705 | 1.569 | 0.136 |
| | D perp. | 0.75 | 0.35 | 1.556 | 1.568 | −0.012 |
| Com. Ex. 6 | D para. | 0.70 | — | — | — | — |
| | D perp. | 0.70 | — | — | — | — |
| Ex. 16 | D para. | 0.60 | 2.3 | 1.705 | 1.569 | 0.136 |
| | D perp. | 0.60 | 0.25 | 1.556 | 1.568 | −0.012 |
| Com. Ex. 7 | D para. | 0.8 | — | — | — | — |
| | D perp. | 0.8 | — | — | — | — |

The symbols in Tables 3 and 4 are illustrated below.
S: size of microparticles in the dispersed phase
N: refractive index
ΔN: N(continuous phase)-N(dispersed phase)
D para.: the direction of stretching
D perp.: the direction perpendicular to the direction of stretching

[Polarizing Property 1]

The total light transmittance, the parallel light transmittance, the diffused light transmittance and the total light reflectance [the total light reflectance was calculated as (total light reflectance)=1−(total light transmittance)] on the polarized light of the polarizing element were measured with use of a polarizing measurement device (manufactured by NIPPON DENSHOKU, NDH-300A) in which an absorption type polarizing plate was inserted to the light source side, only linear polarized light polarizing to the vertical direction was adopted as the light source and the polarizing element of Examples or Comparative Examples was inserted. The measurement was carried out in case where a direction having smaller refractive index differential between the continuous phase and the dispersed phase corresponded with that of the absorption type polarizing plate, and in case where a direction having larger refractive index differential between the continuous phase and the dispersed phase corresponded with that of the absorption type polarizing plate. The polarizing properties of the scattered type are shown in Tables 5 and 6.

TABLE 5

| | Direction | Thickness of polarizer (μm) | Transmittance Total light (%) | Transmittance Parallel light (%) | Transmittance Diffused light (%) | Reflectance Total light (%) | Evaluation |
|---|---|---|---|---|---|---|---|
| Ex. 1 | D para. | 130 | 76 | 11 | 65 | 24 | A |
| | D perp. | 130 | 91 | 60 | 30 | 9 | A |
| Com. Ex. 1 | D para. | 130 | 30 | 10 | 20 | 70 | C |
| | D perp. | 130 | 40 | 25 | 15 | 60 | C |
| Ex. 2 | D para. | 130 | 68 | 9 | 59 | 32 | A |
| | D perp. | 130 | 90 | 58 | 32 | 10 | A |
| Com. Ex. 2 | D para. | 135 | 9 | 8 | 1 | 91 | B |
| | D perp. | 135 | 90 | 83 | 7 | 10 | A |
| Com. Ex. 3 | D para. | — | — | — | — | — | C |
| | D perp. | — | — | — | — | — | C |
| Ex. 3 | D para. | 130 | 78 | 12 | 66 | 22 | A |
| | D perp. | 130 | 92 | 61 | 30 | 8 | A |
| Ex. 4 | D para. | 180 | 46 | 7 | 39 | 54 | A |
| | D perp. | 180 | 84 | 55 | 29 | 16 | A |
| Ex. 5 | D para. | 180 | 44 | 6 | 38 | 56 | A |
| | D perp. | 180 | 86 | 56 | 30 | 14 | A |
| Ex. 6 | D para. | 190 | 47 | 7 | 40 | 53 | A |
| | D perp. | 190 | 85 | 56 | 29 | 15 | A |
| Ex. 7 | D para. | 130 | 85 | 4 | 71 | 15 | A |
| | D perp. | 130 | 91 | 50 | 41 | 9 | A |

TABLE 5-continued

|  | Direction | Thickness of polarizer (μm) | Transmittance | | | Reflectance | Evaluation |
|---|---|---|---|---|---|---|---|
|  |  |  | Total light (%) | Parallel light (%) | Diffused light (%) | Total light (%) |  |
| Com. Ex. 4 | D para. | 130 | 30 | 10 | 20 | 70 | C |
|  | D perp. | 130 | 60 | 36 | 24 | 40 | C |
| Ex. 8 | D para. | 130 | 85 | 14 | 71 | 15 | A |
|  | D perp. | 130 | 91 | 50 | 41 | 9 | A |

TABLE 6

|  | Direction | Thickness of polarizer (μm) | Transmittance | | | Reflectance Total light (%) | Evaluation |
|---|---|---|---|---|---|---|---|
|  |  |  | Total light (%) | Parallel light (%) | Diffused light (%) |  |  |
| Ex. 9 | D para. | 70 | 54 | 8 | 46 | 46 | A |
|  | D perp. | 70 | 87 | 59 | 29 | 13 | A |
| Ex. 10 | D para. | 200 | 38 | 5 | 33 | 62 | A |
|  | D perp. | 200 | 88 | 57 | 31 | 12 | A |
| Ex. 11 | D para. | 170 | 51 | 6 | 45 | 49 | A |
|  | D perp. | 170 | 83 | 54 | 30 | 17 | A |
| Com. Ex. 5 | D para. | 300 | 80 | 70 | 10 | 20 | C |
|  | D perp. | 300 | 78 | 70 | 8 | 22 | C |
| Ex. 12 | D para. | 130 | 36 | 5 | 31 | 64 | A |
|  | D perp. | 130 | 87 | 55 | 31 | 13 | A |
| Ex. 13 | D para. | 130 | 38 | 6 | 32 | 62 | A |
|  | D perp. | 130 | 86 | 55 | 30 | 14 | A |
| Ex. 14 | D para. | 130 | 75 | 15 | 60 | 25 | A |
|  | D perp. | 130 | 91 | 62 | 29 | 9 | A |
| Ex. 15 | D para. | 130 | 70 | 5 | 65 | 30 | A |
|  | D perp. | 130 | 88 | 55 | 25 | 12 | A |
| Com. Ex. 6 | D para. | — | — | — | — | — | C |
|  | D perp. | — | — | — | — | — | C |
| Ex. 16 | D para. | 130 | 59 | 11 | 41 | 41 | A |
|  | D perp. | 130 | 85 | 59 | 26 | 15 | A |
| Com. Ex. 7 | D para. | 130 | 20 | 17 | 5 | 80 | A |
|  | D perp. | 130 | 20 | 17 | 5 | 80 | A |

The symbols in Tables 5 and 6 are illustrated below.

D para.: the direction of stretching

D perp.: the direction perpendicular to the direction of stretching

[Polarizing Property 2]

Figure 6:
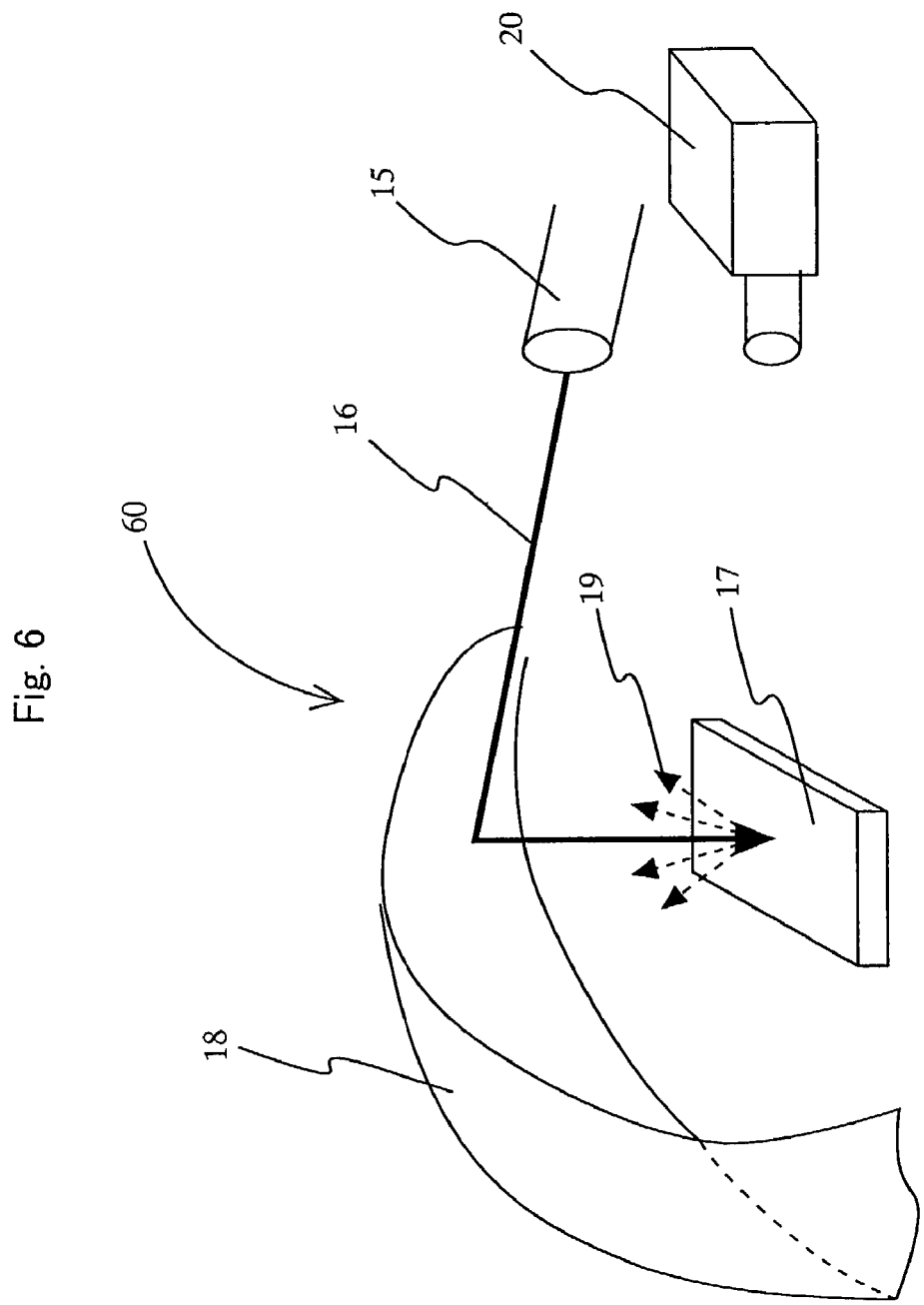
FIG. 6 is a schematic view showing a measurement method of polarizing properties with use of an optical system measuring device.

Concerning the scattering characteristic (property) F(θ) on the polarizing light, samples of Example 5 and Comparative Example 2 were measured by using a optical system polarizing measuring device (manufactured by Otsuka Electronics Co. Ltd., REF5000). FIG. 6 is a schematic view showing a measurement method of polarizing properties by using the measuring device. An illuminated light 16 emerged from a light source 15 is reflected by a non-spherical mirror 18, illuminates a sample 17 to scatter, and the scattered light 19 is measured by using a two-dimensional CCD camera 20. By such a method, the scattering property of light transmittance and of light reflectance can be obtained by an optical system measuring device 60. FIGS. 12 to 15 show the scattering properties in all directions in case that the polarizing property of the polarizing element of Example 5 was measured by this device. Moreover, the straight and reflection intensities at 0° of scattering angle in FIGS. 12 to 15 are shown in Table 7.

TABLE 7

|  | Incident polarized light | Transmission | Reflection |
|---|---|---|---|
| Ex. 5 | D para. | 13 | 7 |
|  | D perp. | 364 | 7 |
| Com. Ex. 2 | D para. | 48 | 194 |
|  | D perp. | 600 | 25 |

The symbols in Table 7 are illustrated below. The values in the Table are relative values.

D para.: the direction scattering or reflecting the incident polarized light intensely D perp.: the direction almost transmitting the incident polarized light Example 1

Figure 7:
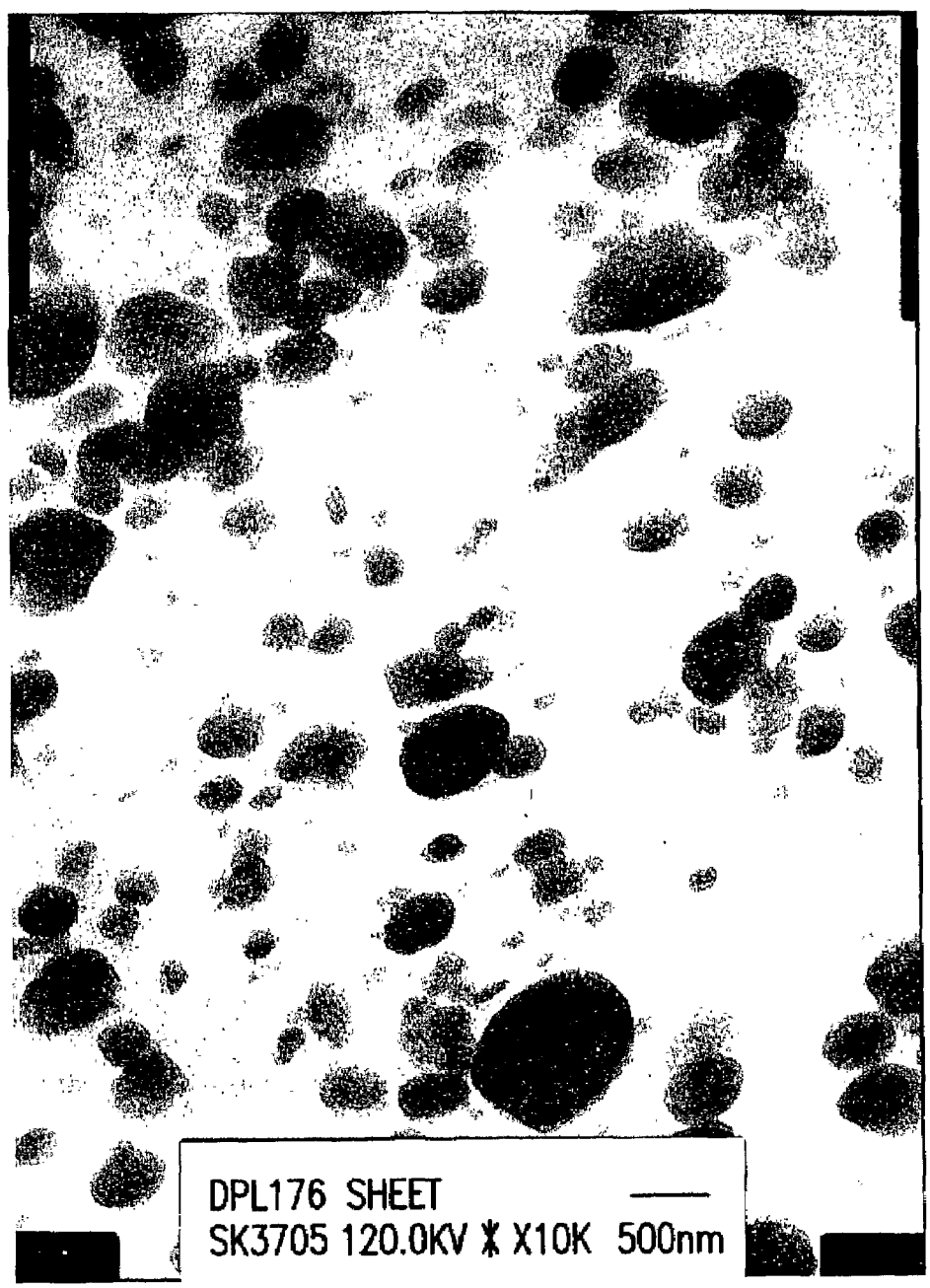
FIG. 7 is a transmittable electron micrograph (x 10,000) showing the minute structure of the original sheet of Example 1.

As a transparent resin constituting the continuous phase, 70 parts by weight of PET 1 (crystalline polyethylene terephthalate resin), and as a transparent resin constituting the dispersed phase, 30 parts by weight of ESBS (epoxidized diene-series block copolymer resin) were used. PET 1 was dried at 140° C. for 4 hours to remove water enough, and maintained aridity at 70° C. ESBS was dried at 70° C. for about 4 hours. Both of them were mixed together by using a drum-shaped mixer, and melt-kneaded at about 270° C. by using a biaxial extruder to obtain a pellet. The pellet was dried and melt-extruded at about 270° C. by using a monoaxial extruder, T-die and a roll-type draw machine equipped a cooler to obtain an original sheet being about 40 μm thick and about 10 cm wide by stretching at the draw ratio of about twice from the T-die and the roll surface temperature of about 40° C. Thus obtained sheet was almost transparent. PET 1 was supercooled without crystallization. Observation of DSC measurement revealed that exothermic peak of crystallization was confirmed in the neighborhood of 120° C. The observation result (x 10,000) of cross section of the sheets by a transmittable electron microscope (TEM; dyeing with osmic acid) is shown in FIG. 7. As demonstrated in FIG. 7, the dispersed phase was dispersed approximately spherically and almost uniformly, and the diameter thereof was 0.5 μm on average.

Figure 8:
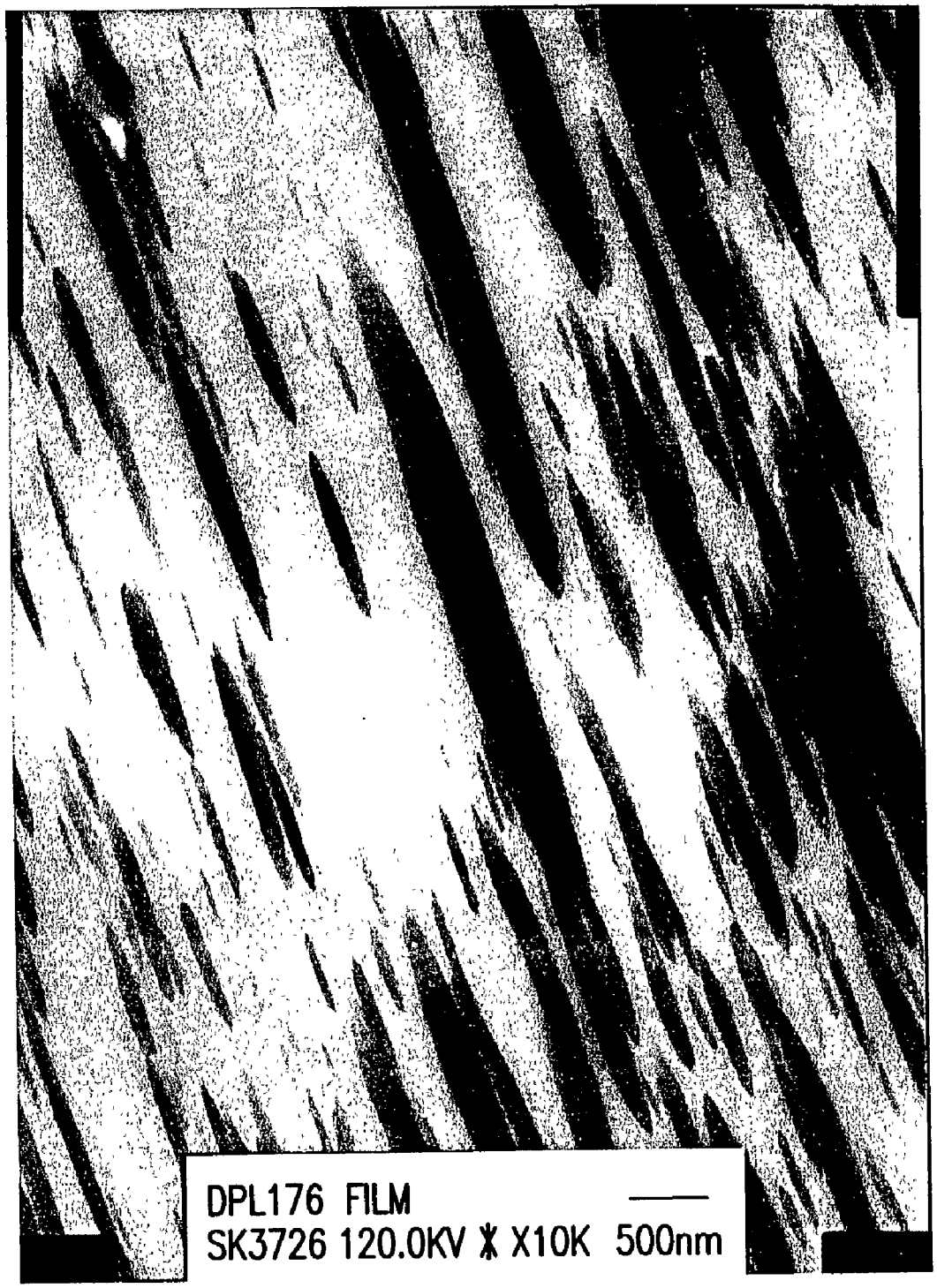
FIG. 8 is a transmittable electron micrograph (x 10,000) showing the minute structure of the polarizing element of Example 1.

Thus obtained sheet was stretched 4 times in stretching factor at 80° C. with use of a tensile testing machine. As a result, a sheet being about 130 μm thick and showing polarizing property was obtained. The observation result (x 10,000) of cross section of the sheet in the same manner to the above-mentioned method is shown in FIG. 8. As demonstrated in FIG. 8, the dispersed phase was dispersed almost uniformly with transformation from approximately spherically to rugby-ball like, and the length in the stretched direction (major axis) was about 2 μm and the length in a direction perpendicular to the stretched direction (minor axis) was about 0.25 μm. In the sheet showing such a polarizing property, the total light transmittance, the parallel light transmittance, the diffused light transmittance and the total light reflectance were measured by methods described in the section of "Polarizing property 1". The results are shown in Table 5.

Comparative Example 1

The both resins were dried in the similar manner to Example 1 except that 30 parts by weight of SBS (SBS-series block copolymer) was used as a resin constituting the dispersed phase. Further, the resins were attempted to melt-knead by using the biaxial extruder in the similar manner to Example 1. However it was incapable of producing a pellet stably. The pellet was attempted to dry and melt by a monoaxial extruder to produce an original sheet. However, since the film-forming property is not good, the original sheet was not obtained. Therefore, thus obtained defective sheet was heat-melted by a pressing machine to produce an original sheet being about 400 μm thick. Thus obtained sheet was transparent. The crystalline polyethylene terephthalate in the sheet was supercooled without crystallization. Observation of DSC measurement revealed that exothermic peak of crystallization was confirmed in the neighborhood of 120° C. The observation result of cross section of the sheet in the similar manner to Example 1 revealed that the dispersed phase was dispersed approximately spherically and about uniformly, and the diameter was 0.6 μm on average. Thus obtained sheet was stretched 4 times in stretching factor at 80° C. with use of a tensile testing machine. As a result, a sheet being about 130 μm thick and showing polarizing property was obtained. However, the sheet had voids and was blanched unevenly. The observation result of cross section of the sheet in the same manner to Example 1 revealed that the dispersed phase was transformed from almost spherically to rugby-ball like, that the length in the stretched direction (major axis) was about 2.1 μm and the length in a direction perpendicular to the stretched direction (minor axis) was about 0.27 μm, and that the voids were generated in the fringe of boundary between the dispersed phase and the continuous phase. The properties of the obtained sheet are shown in Table 5.

Example 2

Three kinds of resins were dried in the similar to Example 1 except that 25 parts by weight of SBS (SBS-series block copolymer) was used as a transparent resin constituting the dispersed phase and 5 parts by weight of ESBS (epoxidized diene-series block copolymer) was used as a compatibilizing agent. The three kinds of resins were melt-kneaded by using a biaxial extruder in the similar manner to Example 1, and produced an original sheet being about 400 μm thick and about 10 cm wide by using a monoaxial extruder. As with Example 1, thus obtained sheet was transparent, and PET 1 was supercooled without crystallization. As with Example 1, the observation result of cross section of the original sheet revealed that the dispersed phase was dispersed approximately spherically and almost uniformly, and the diameter was 0.4 μm on average.

Thus obtained sheet was stretched 4 times in stretching factor at 80° C. with use of a tensile testing machine. As a result, a sheet being about 130 μm thick and showing polarizing property was obtained. The observation result of cross section of the sheet in the same manner to Example 1 revealed that the dispersed phase was dispersed almost uniformly with transformation from approximately spherically to rugby-ball like, and the length in the stretched direction (major axis) was about 1.8 μm and the length in a direction perpendicular to the stretched direction (minor axis) was about 0.20 μm. Incidentally, no voids as Comparative Example 1 were generated. The properties of obtained sheet are shown in Table 5.

Comparative Example 2

The polarizing properties of a commercially available reflection type polarizing plate (manufactured by 3M, D-BEF) were measured in the same manner to Example 1. The results of the total light transmittance, the parallel light transmittance, the diffused light transmittance and the total light reflectance on the polarized light are shown in Table 5.

Comparative Example 3

The original sheet produced by Example 1 was subjected to monoaxial stretching at 130° C. Because of crystallization of the original sheet, the sheet was broken in process of the monoaxial stretching. As a result, it was impossible to obtain a sheet having polarizing property.

Example 3

The sheet showing polarizing properties obtained from Example 1, in which the vertical both ends of the sheet was held by a monoaxial stretching machine, was heated to 150° C. and subjected to heat treatment for 2 minutes, and cooled to room temperature. The heat-treated sheet kept polarizing properties. The sheet was not constricted even when it was put into an oven at 120° C. for 1 hour, and maintained the polarizing properties. The polarizing properties of the obtained sheet are shown in Table 5.

Example 4

The dried two resins as the same with Example 1 were mixed together by using a drum-shaped mixer and melt-kneaded at 270° C. by using a biaxial extruder to obtain a pellet. An original sheet was produced in the similar manner to Example 1 except that the pellet was dried and melt-extruded at 270° C. by using a monoaxial extruder, T-die and a roll-type draw machine equipped a cooler to obtain an original sheet being about 390 μm thick and about 30 cm wide by stretching at the draw ratio of about twice from the T-die and the roll surface temperature of about 40° C. Thus obtained sheet had approximately the same transparency with that of Example 1. The observation result of cross section of the original sheet in the similar manner to Example 1 revealed that the dispersed phase was dispersed approximately spherically and almost uniformly, and the diameter was 0.5 μm on average. This sheet was monoaxially stretched by the roll calendering method [temperature, 80° C.; stretching factor, about 2 times (thickness reduction rate, about ½); width reduction rate, about 3%] to obtain a 180 μm thick film. Thus obtained calendered sheet showed polarizing properties. The observation result of cross section of the calendered sheet in the same manner to Example 1 revealed that the dispersed phase was dispersed almost uniformly with transformation from approximately spherically to rugby-ball like, and the length in the stretched direction (major axis) was about 1.6 μm and the length in a direction perpendicular to the stretched direction (minor axis) was about 0.23 μm. The properties of obtained sheet are shown in Table 5.

Example 5

Figure 12:
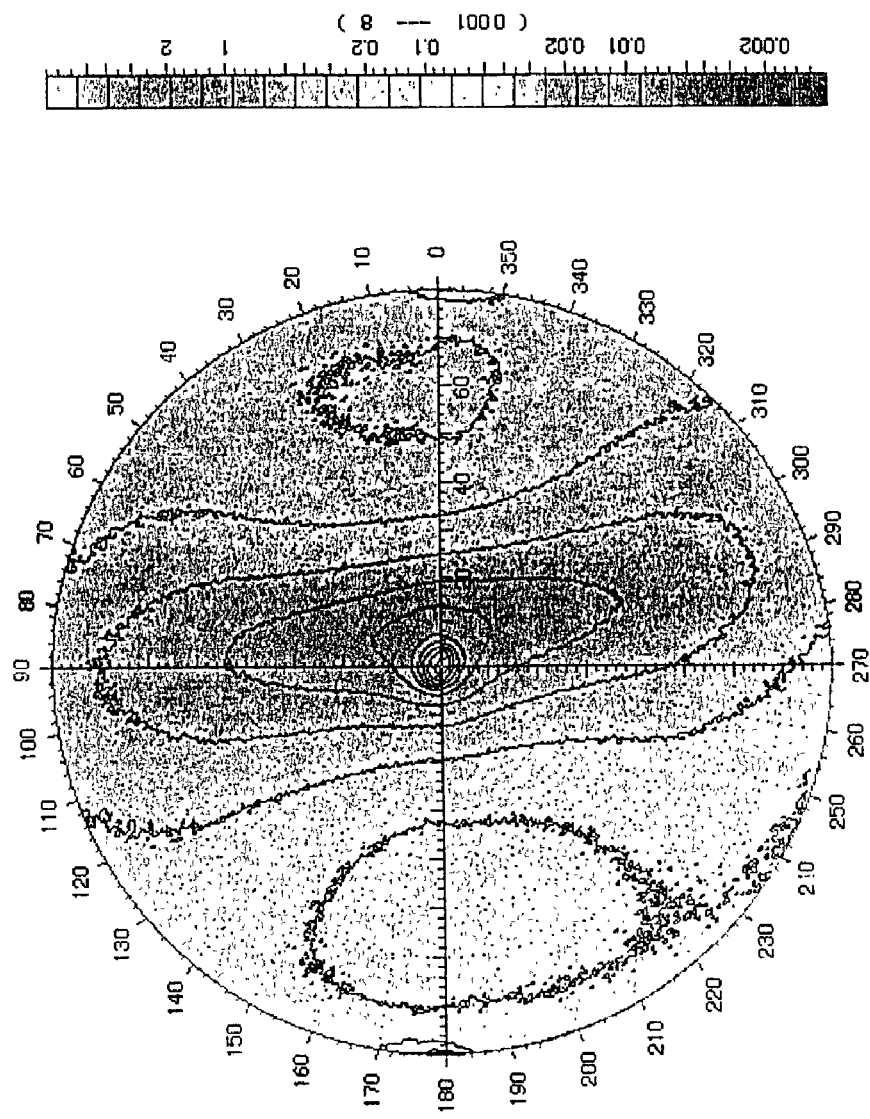
FIG. 12 is a figure showing direction distribution of a polarized light in which an incident polarized light reflects in parallel direction to the calendered direction in the polarizing element of Example 5.
Figure 13:
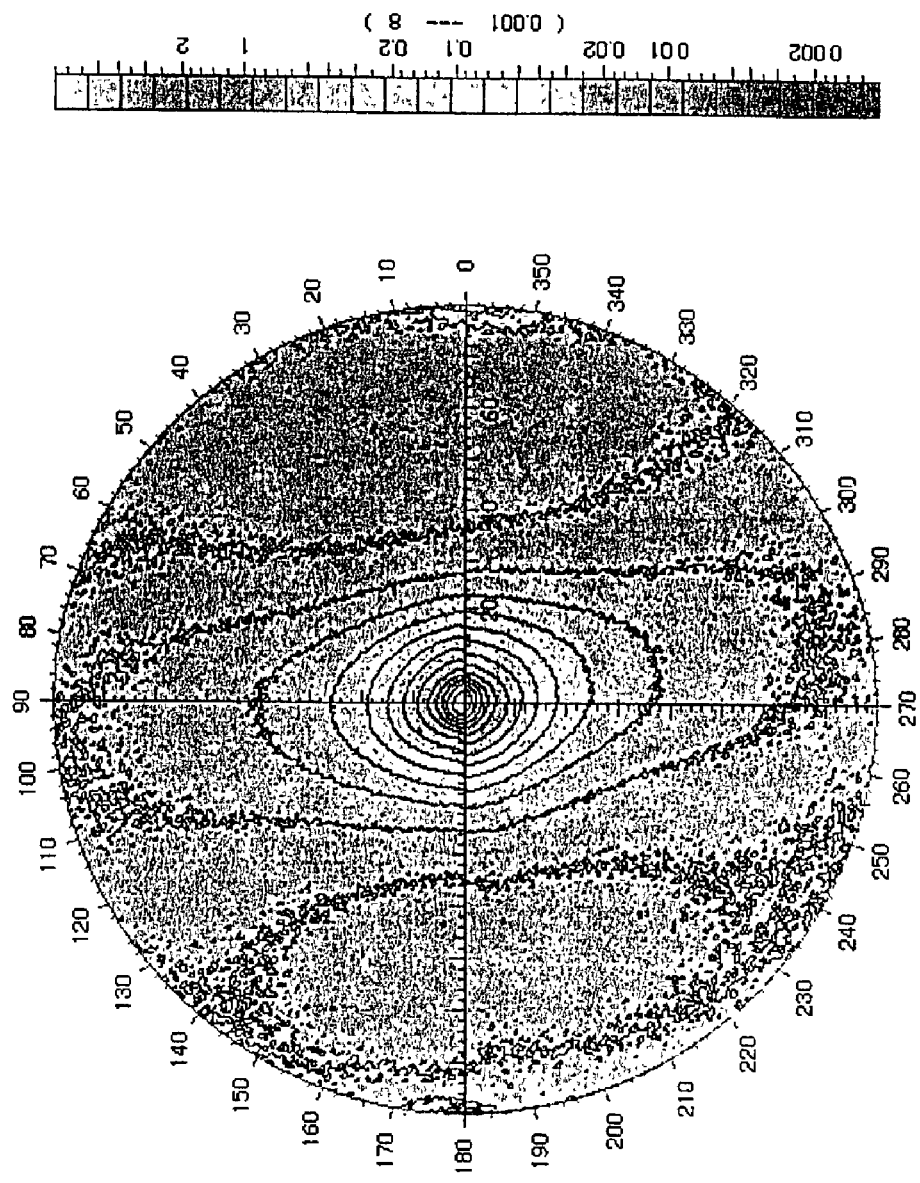
FIG. 13 is a figure showing direction distribution of a polarized light in which an incident polarized light is transmitted in parallel direction to the calendered direction in the polarizing element of Example 5.
Figure 14:
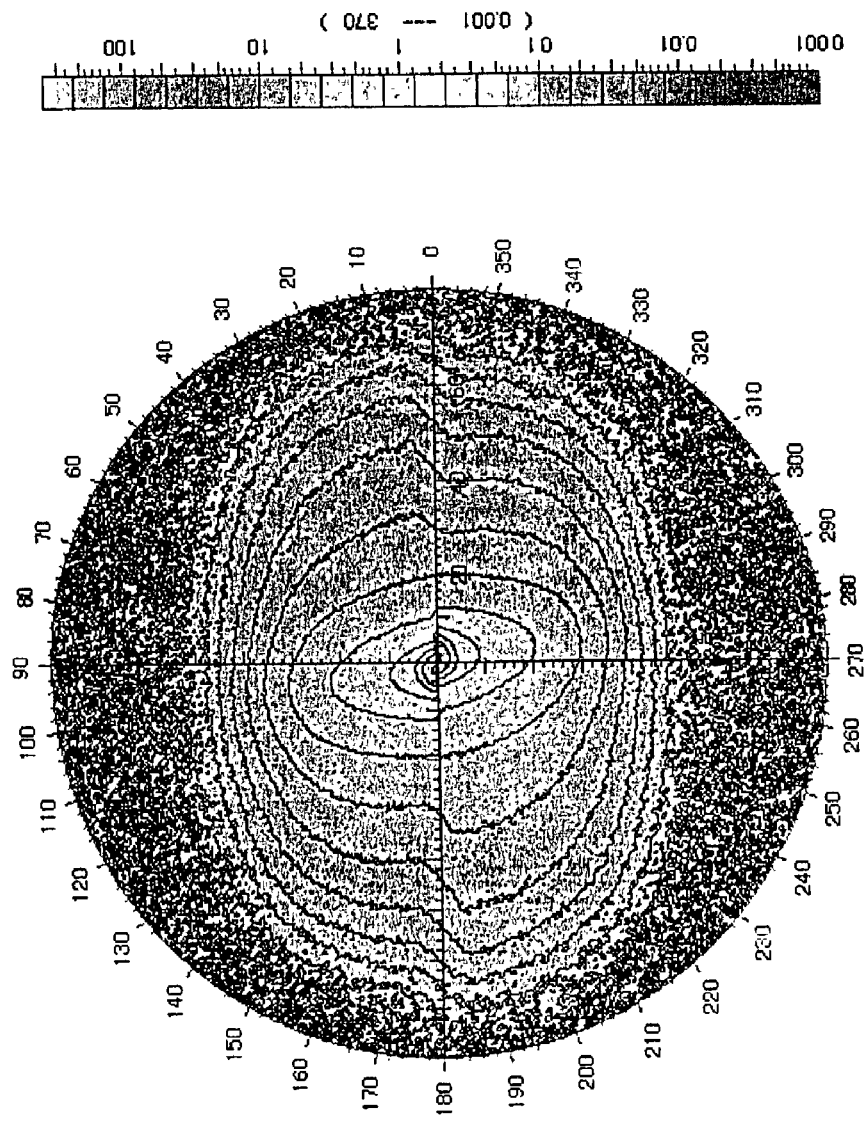
FIG. 14 is a figure showing direction distribution of a polarized light in which an incident polarized light reflects in perpendicular direction to the calendered direction in the polarizing element of Example 5.
Figure 15:
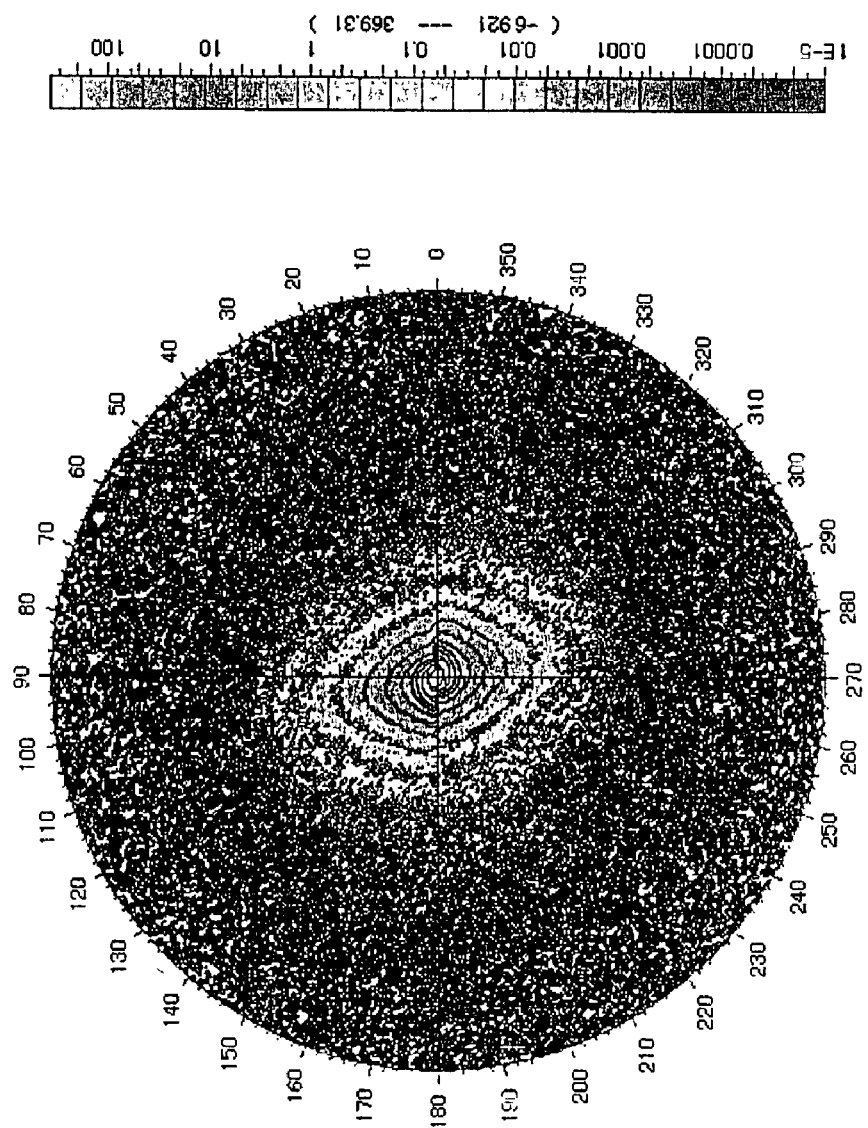
FIG. 15 is a figure showing direction distribution of a polarized light in which an incident polarized light is transmitted in perpendicular direction to the calendered direction in the polarizing element of Example 5.

The sheet showing the polarizing properties of Example 4 was fixed in entire fringe, and subjected to heat treatment at 150° C. for 2 minutes. The heat-treated sheet kept polarizing properties. The sheet was not constricted even when it was put into an oven at 120° C. for 1 hour, and maintained the polarizing properties. The reflection and transmission polarizing properties of the polarizer were measured by the measuring device shown in FIG. 6, and the results are shown in FIGS. 12 to 15. FIG. 12 is a figure showing direction distribution of a polarized light in which an incident polarized light reflects in parallel to a calendered direction (a scattered direction having larger refractive index differential between the continuous phase and the dispersed phase). FIG. 13 is a figure showing direction distribution of a polarized light in which an incident polarized light is transmitted in parallel to a calendered direction. FIG. 14 is a figure showing direction distribution of a polarized light in which an incident polarized light reflects in perpendicular direction to a calendered direction (a direction having smaller refractive index differential between the continuous phase and the dispersed phase). FIG. 15 is a figure showing direction distribution of a polarized light in which an incident polarized light is transmitted in perpendicular direction to a calendered direction. In particular, as shown in FIG. 12, a polarized light in the scattered direction of the polarizer is also scattered over wide angle in case of reflection. Moreover, as shown in FIG. 15, in a direction having smaller refractive index differential between the continuous phase and the dispersed phase, a polarized light in the transmitted direction of the polarizer has simply strong intensity and is transmitted with scattering at slightly small angle. Moreover, Table 7 shows reflection intensities at 0° of scattering angle (straight and regular reflection) in FIGS. 12 to 15.

Table 7 also shows the values of the reflection type polarizing element of Comparative Example 2. Particularly, the polarizing element of Example 5 scatters intensely in case both where polarized light is transmitted and where it is reflected. The polarizing properties of the obtained sheet are shown in Table 5.

Example 6

In order to produce a polarizing element which comprises a layer (1) showing polarizing properties by means of orientation treatment by stretching, and a transparent resin layer (2) which is laminated on at least one side of the layer (1) before the stretching step and is not provided with polarizing properties by stretching, the same material as Example 1 was used as raw material of the layer (1) showing polarizing properties, and PET 1 constituting the continuous phase was used as the transparent resin layer (2) of a surface layer. Two kinds of resins such as Example 1 are used as raw material of the layer (1) showing polarizing properties, the resins were kneaded (compounded) by a monoaxial extruder in the similar manner to Example 1. Further, using an extruder of multi-layered type, the layer (1) showing polarizing properties was melted at about 270° C. and the both surface layers (2) were melted at about 280° C., and extruded from a T-die at a draw ratio of about 1.9 onto a cooling drum having the a surface temperature of 40° C., and 70 μm of the surface layers (2) (a transparent resin layer) was laminated on both sides of 300 μm of the center layer (1) to obtain a laminated sheet having three-layered structure (440 μm-thick). This sheet was monoaxially stretched by the roll calendering method (temperature, 80° C.; stretching factor, about 2 times (thickness reduction rate, about ½); width reduction rate, about 3%) in the same manner to Example 4 to obtain a about 190 μm thick film. Thus obtained calendered sheet showed polarizing properties. The polarizing properties of the obtained sheet are shown in Table 5.

Example 7

An original sheet being about 400 μm thick and about 10 cm wide was obtained in the similar manner to Example 2 except that 25 parts by weight of MXD-6 (polyxylylenediamine diadipate resin) was used as a resin constituting the dispersed phase instead of SBS-series resin, wherein the resins were melt-kneaded by using a monoaxial extruder. Thus obtained original sheet was transparent. The crystalline polyethylene terephthalate in the sheet was supercooled without crystallization. The observation of DSC measurement revealed that exothermic peak of crystallization was confirmed in the neighborhood of 120° C. The observation result of cross section of the sheet in the similar manner to Example 1 revealed that the dispersed phase was dispersed approximately spherically and almost uniformly, and the diameter was 0.45 μm on average. The sheet was stretched 4 times in stretching factor at 80° C. with use of a tensile testing machine. As a result, a sheet being about 130 μm thick and showing polarizing properties was obtained. The observation of cross section of the sheet in the same manner to Example 1 revealed that the dispersed phase was dispersed almost uniformly with transformation from approximately spherically to rugby-ball like, and the length in the stretched direction (major axis) was about 1.7 μm and the length in a direction perpendicular to the stretched direction (minor axis) was about 0.21 μm. Incidentally, no voids were generated. The properties of the obtained sheet are shown in Table 5.

Comparative Example 4

The resins were melt-kneaded (compounded) by using a monoaxial extruder in the similar manner to Example 7 except that ESBS was not used as a compatibilizing agent and 30 parts by weight of MXD-6 was used, and in this case, it was incapable of melt-molding stably. Therefore, thus obtained defective sheet was heat-melted by a pressing machine to produce an original sheet being about 400 μm thick, as the similar manner to Comparative Example 1. Thus obtained sheet was transparent. PET 1 in the sheet was supercooled without crystallization. The observation of DSC measurement revealed that exothermic peak of crystallization was confirmed in the neighborhood of 120° C. According to the observation of cross section of the sheet in the similar manner to Example 1, the dispersed phase was dispersed approximately spherically and almost uniformly, and the diameter was 0.45 μm on average. Thus obtained sheet was stretched 4 times in stretching factor at 80° C. with use of a tensile testing machine. As a result, a sheet being about 130 μm thick and showing polarizing properties was obtained. However, the sheet had voids and was blanched unevenly. The observation of cross section of the stretched sheet in the same manner to Example 1 revealed that the dispersed phase was dispersed with transformation from almost spherically to rugby-ball like, that the length in the stretched direction (major axis) was about 2.0 μm and the length in a direction perpendicular to the stretched direction (minor axis) was about 0.28 μm, and that voids were generated in the fringe of boundary between of the dispersed phase and the continuous phase. The polarizing properties of obtained sheet are shown in Table 5.

Example 8

The sheet showing the polarizing properties obtained from Example 7 was fixed in entire fringe in the similar manner to Example 5, and subjected to heat treatment at 150° C. for 2 minutes. The heat-treated sheet kept polarizing properties. The sheet was not constricted even when it was put into an oven at 120° C. for 1 hour, and maintained the polarizing properties. The polarizing properties of obtained sheet are shown in Table 5.

Example 9

An original sheet being about 10 cm wide was produced in the similar manner to Example 1 except that the thickness of the original sheet was about 200 μm. Thus obtained original sheet was stretched 4 times in stretching factor at 80° C. with use of a tensile testing machine in the similar manner to Example 1. As a result, a sheet being about 70 μm thick and showing polarizing properties was obtained. The polarizing properties of obtained sheet are shown in Table 6.

Example 10

An original sheet being about 10 cm wide was produced in the similar manner to Example 1 except that the thickness of the original sheet was about 600 μm. Thus obtained original sheet was stretched 4 times in stretching factor at 80° C. with use of a tensile testing machine in the similar manner to Example 1. As a result, a sheet being about 200 μm thick and showing polarizing properties was obtained. The polarizing properties of obtained sheet are shown in Table 6.

Example 11

An original sheet was obtained in the similar manner to Example 1 except that the original sheet was stretched 3 times in stretching factor at 80° C. with use of a tensile testing machine. As a result, a sheet being about 170 μm thick and showing polarizing properties was obtained. The polarizing properties of obtained sheet are shown in Table 6.

Comparative Example 5

An original sheet was obtained in the similar manner to Example 1 except that the original sheet was stretched 1.5 times in stretching factor at 80° C. with use of a tensile testing machine. As a result, a sheet being about 300 μm thick was obtained. However, the sheet hardly showed polarizing properties. The polarizing properties of obtained sheet are shown in Table 6.

Example 12

An original sheet was obtained in the similar manner to Example 1 except that the original sheet was stretched at 60° C. with use of a tensile testing machine. As a result, a sheet being about 130 μm thick and showing polarizing properties was obtained. The polarizing properties of obtained sheet are shown in Table 6.

Example 13

An original sheet was obtained in the similar manner to Example 1 except that the original sheet was stretched at 110° C. with use of a tensile testing machine. As a result, a sheet being about 130 μm thick and showing polarizing properties was obtained. The polarizing properties of obtained sheet are shown in Table 6.

Example 14

An original sheet being about 400 μm thick and about 10 cm wide was produced in the similar manner to Example 1 except that 85 parts by weight of PET 1 as a resin constituting the continuous phase and 15 parts by weight of ESBS as a resin constituting the dispersed phase were used. Thus obtained sheet was almost transparent. PET 1 in the sheet was supercooled without crystallization. The observation result of cross section of the original sheet revealed that the dispersed phase was dispersed approximately spherically and almost uniformly, and the diameter was 0.25 μm on average. Thus obtained sheet was stretched 4 times in stretching factor at 80° C. with use of a tensile testing machine. As a result, a sheet being about 130 μm thick and showing polarizing properties was obtained. The observation result of cross section of thus obtained stretched sheet revealed that that the dispersed phase was dispersed almost uniformly with transformation from approximately spherically to rugby-ball like, that the length in the stretched direction (major axis) was about 1.0 μm and the length in a direction perpendicular to the stretched direction (minor axis) was about 0.13 μm, and that no voids were generated. The polarizing properties of obtained sheet are shown in Table 6.

Example 15

An original sheet being about 400 μm thick and about 10 cm wide was produced in the similar manner to Example 1 except that 55 parts by weight of PET 1 and 45 parts by weight of ESBS were used as a resin constituting the continuous phase and a resin constituting the dispersed phase, respectively. Thus obtained sheet was almost transparent. PET 1 in the sheet was supercooled without crystallization. The observation result of cross section of the original sheet revealed that the dispersed phase was dispersed approximately spherically and almost uniformly, and the diameter was 0.75 μm on average. Thus obtained sheet was stretched 4 times in stretching factor at 80° C. with use of a tensile testing machine. As a result, a sheet being about 130 μm thick and showing polarizing properties was obtained. The observation result of cross section of thus obtained stretched sheet revealed that that the dispersed phase was dispersed almost uniformly with transformation from approximately spherically to rugby-ball like, that the length in the stretched direction (major axis) was about 3.0 μm and the length in a direction perpendicular to the stretched direction (minor axis) was about 0.35 μm, and that no voids were generated. The polarizing properties of obtained sheet are shown in Table 6.

Comparative Example 6

The resins were compounded in the similar manner to Example 15 except that 45 parts by weight of SBS was used instead of ESBS, and in this case, it was incapable of compounding stably. Therefore, thus obtained defective mixture was heat-melted by a pressing machine to produce an original sheet being about 400 μm thick. The observation result of cross section of the original sheet revealed that the dispersed phase was dispersed approximately spherically and almost uniformly, and the diameter was 0.70 μm on average. Thus obtained sheet was stretched 4 times in stretching factor at 80° C. with use of a tensile testing machine, and the sheet was broken in process of the stretching. As a result, it was impossible to obtain a sheet having polarizing properties.

Example 16

Figure 9:
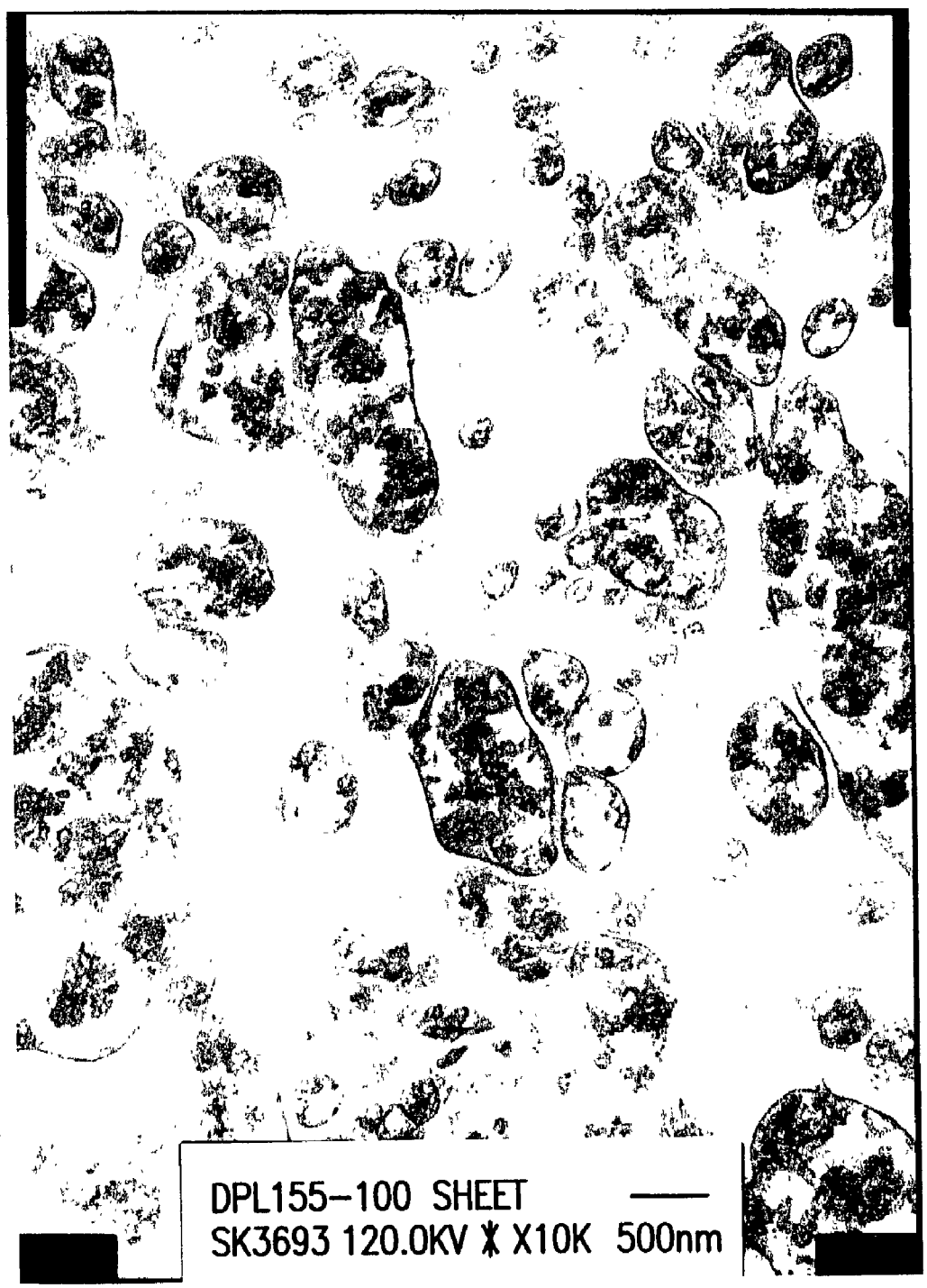
FIG. 9 is a transmittable electron micrograph (x 10,000) showing the minute structure of the original sheet of Example 16.

As a resin constituting the continuous phase, 70 parts by weight of PET 2 (crystalline polyethylene terephthalate resin), as a resin constituting the dispersed phase, 25 parts by weight of PS (polystyrene resin), and as a compatibilizing agent, 5 parts by weight of ESBS (epoxidized diene-series block copolymer) were used. PET 2 was dried at 140° C. for 4 hours to remove water enough, and maintained to drying at 70° C. PS and ESBS were dried at 70° C. for about 4 hours. These resin were compounded and molded in the similar manner to Example 1 to produce an original sheet being about 400 μm thick and about 10 cm wide. Thus obtained sheet was almost transparent. The crystalline polyethylene terephthalate in the sheet was supercooled without crystallization. As with Example 1, the observation result (×10,000) of cross section of the original sheet is shown in FIG. 9. As shown in FIG. 9, the dispersed phase was dispersed approximately spherically and almost uniformly, and the diameter was 0.6 μm on average.

Figure 10:
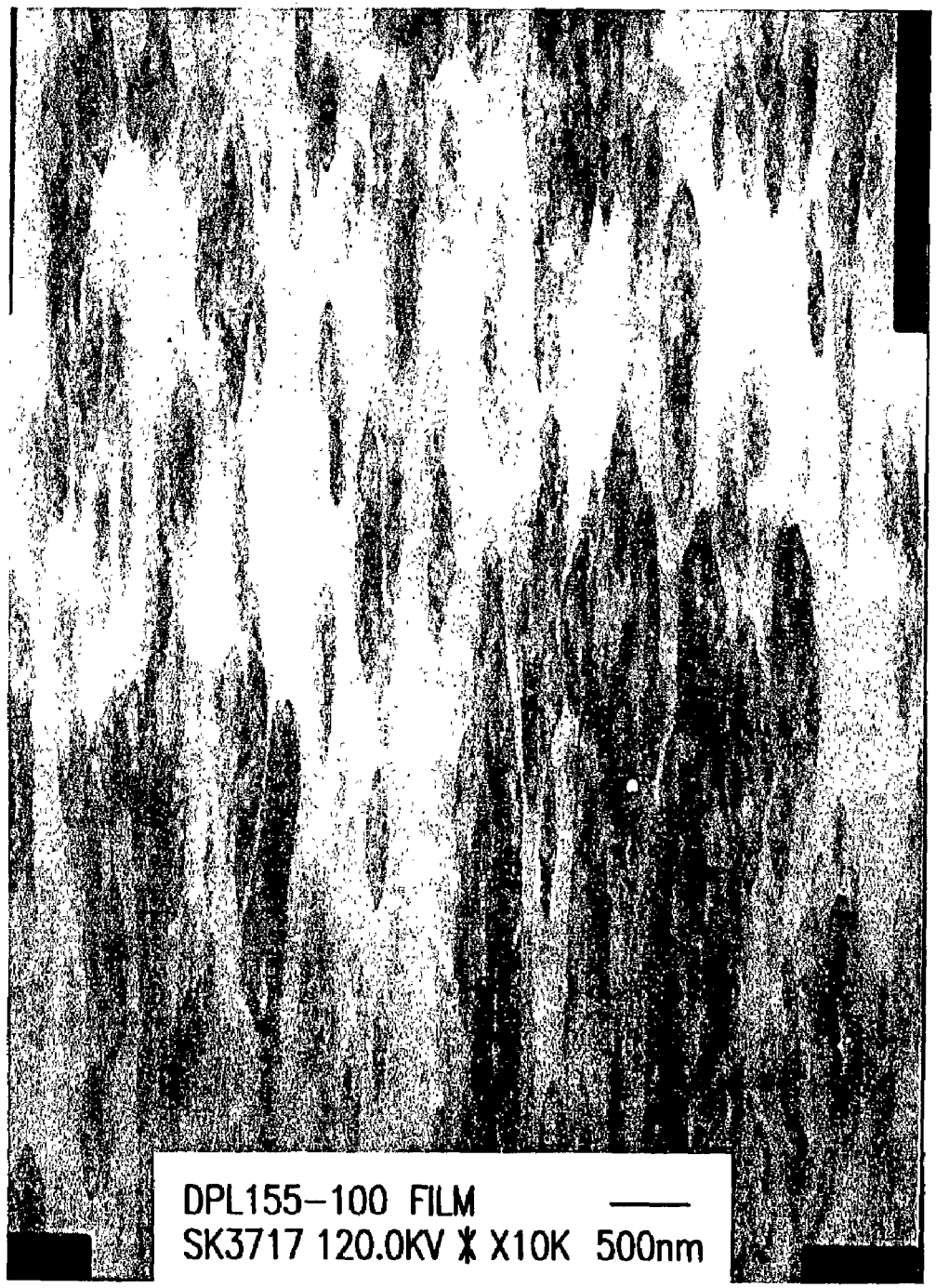
FIG. 10 is a transmittable electron micrograph (x 10,000) showing the minute structure of the polarizing element of Example 16.

Thus obtained sheet was stretched 4 times in stretching factor at 80° C. with use of a tensile testing machine. As a result, a sheet being about 130 μm thick and showing polarizing properties was obtained. In the similar manner to the above-mentioned manner, the observation result (×10,000) of cross section of the stretched sheet is shown in FIG. 10. As shown in FIG. 10, the dispersed phase was dispersed almost uniformly with transformation from approximately spherically to rugby-ball like, and the length in the stretched direction (major axis) was about 2.3 μm and the length in a direction perpendicular to the stretched direction (minor axis) was about 0.25 μm. No voids were generated. FIG. 10 revealed that the compatibilizing agent was detected in the interface between the continuous phase and the dispersed phase (butadiene parts in ESBS were dyed with osmic acid so that the parts came out black), and that PET 2 was chemically bonded to ESBS, and ESBS was bonded with affinity for PS by blending efficiently. The polarizing properties of obtained sheet are shown in Table 6.

Comparative Example 7

Figure 11:
FIG. 11 is a transmittable electron micrograph (x 2,500) showing the minute structure of the stretched product of Comparative Example 7.

The resins were compounded and molded in the similar manner to Example 16 except that only 70 parts by weight of PET 2 (crystalline polyethylene terephthalate) and 30 parts by weight of PS (polystyrene resin) were used as a resin constituting the continuous phase and a resin constituting the dispersed phase, respectively, to produce an original sheet being about 400 μm thick and about 10 cm wide. The sheet was stretched at 80° C. in the similar manner to Example 16, as a result the sheet was entirely blenched to become opaque. As with Example 1, the observation result (×2,500) of cross section of the sheet is shown in FIG. 11. As shown in FIG. 11, PET 2 constituting the continuous phase and PS constituting the dispersed phase were delaminated to generate voids. The polarizing properties of obtained sheet are shown in Table 6.

What is claimed is:

1. A polarizing element comprising a stretched sheet composed of a continuous phase and a dispersed phase dispersed in the form of a particle in the continuous phase, wherein the continuous phase comprises a first transparent resin and the dispersed phase comprises a second transparent resin, a refractive index differential between the continuous phase and the dispersed phase on a linear polarized light in a stretched direction of the sheet is different from that in a direction perpendicular to the stretched direction, incident light with a polarization state for which the refractive index differential is smaller is transmitted through the polarizing element, and incident light with a polarization state for which the refractive index differential is larger is scattered by the polarizing element, and the continuous phase and the dispersed phase are bonded each other substantially free from voids between the both phases, wherein a combination of the first transparent resin and the second transparent resin is at least one selected from the group consisting of the following combinations:

a combination of the first transparent resin having a carboxyl group with the second transparent resin having at least one functional group selected from the group consisting of a hydroxyl group, an amino group and an epoxy group, a combination of the first transparent resin having a hydroxyl group with the second transparent resin having at least one functional group selected from the group consisting of a carboxyl group, an acid anhydride group and an isocyanate group, and a combination of the first transparent resin having an amino group with the second transparent resin having at least one functional group selected from the group consisting of a carboxyl group, an acid anhydride group and an epoxy group.

2. The polarizing element according to claim 1, wherein the first transparent resin comprises a polyester-series resin, and the second transparent resin comprises a resin being reactive to the polyester-series resin and having at least one functional group selected from the group consisting of an epoxy group, an amino group, an acid anhydride group, a hydroxyl group and an isocyanate group.

3. The polarizing element according to claim 2, wherein the first transparent resin comprises a polyester-series resin, and the second transparent resin comprises at least one transparent resin selected from the group consisting of an epoxidized styrene-diene-series copolymer, a polyamide-series resin, an anhydrous carboxylic acid-modified polyolefinic-series resin, a polyester-series resin and a polyurethane-series resin.

4. The polarizing element according to claim 2, wherein a concentration of a carboxyl group in the polyester-series resin is 5 to 300 mili-equivalent/kg, or a concentration of a hydroxyl group in the polyester-series resin is 5 to 300 mili-equivalent/kg.

5. The polarizing element according to claim 1, wherein the first transparent resin comprises a crystalline polyester-series resin, the second transparent resin comprises a styrene-diene-series copolymer having an epoxy group in a main chain thereof, and a ratio of the continuous phase relative to the dispersed phase is 95/5 to 60/40 (weight ratio).

6. A method for producing the polarizing element recited in claim 1, which comprises melt-mixing the first transparent resin with the second transparent resin for molding the sheet, and stretching the sheet monoaxially to produce the polarizing element, wherein a refractive index of the first transparent resin is close to that of the second transparent resin, and the both resins are capable of binding with each other by at least one selected from an intramolecular reactive group or a presence of a compatibilizing agent.

7. The method according to claim 6, wherein a crystalline polyester-series resin is used as the first transparent resin and a styrene-diene-series copolymer having an epoxy group in a main chain thereof is used as the second transparent resin, and the method comprises cooling and solidifying the crystalline polyester-series resin in a non-crystalline state thereof for forming the sheet, and stretching the sheet monoaxially at a temperature which is 30 to 120° C. lower than a crystallization temperature of the crystalline polyester-series resin.

8. The method according to claim 6, which further comprises heat-treating the stretched sheet at a temperature not less than a stretching temperature thereof.

9. A polarizing element comprising a stretched sheet composed of a continuous phase and a dispersed phase dispersed in the form of a particle in the continuous phase, wherein the continuous phase comprises a first transparent resin and the dispersed phase comprises a second transparent resin, a refractive index differential between the continuous phase and the dispersed phase on a linear polarized light in a stretched direction of the sheet is different from that in a direction perpendicular to the stretched direction, incident light with a polarization state for which the refractive index differential is smaller is transmitted through the polarizing element, and incident light with a polarization state for which the refractive index differential is larger is scattered by the polarizing element, and the continuous phase and the dispersed phase are bonded each other substantially free from voids between both the phases, wherein the polarizing element further comprises a compatibilizing agent having an epoxy group in a main chain thereof, and the compatibilizing agent is interposed between the continuous phase and the disposed phase to be substantially free from voids between both the phases.

10. The polarizing element according to claim 9, wherein the first transparent resin comprises a polyester-series resin, the second transparent resin comprises at least one member selected from a polystyrenic resin and a polyamide-series resin, and the compatibilizing agent comprises an epoxidized styrene-diene-series copolymer.

11. The polarizing element according to claim 9, wherein a ratio of the continuous phase relative to the dispersed phase is 99/1 to 50/50 (weight ratio), and a ratio of the dispersed phase relative to the compatibilizing agent is 99/1 to 50/50 (weight ratio).

12. The polarizing element according to claim 9, wherein the first transparent resin comprises a crystalline polyester-series resin, the second transparent resin comprises at least one member selected from the group consisting of a polystyrene, a styrene-diene-series block copolymer and an aromatic polyamide-series resin, and the compatibilizing agent comprises an epoxidized styrene-diene-series block copolymer, a ratio of the continuous phase relative to the dispersed phase is 95/5 to 60/40 (weight ratio), and a ratio of the dispersed phase relative to the compatibilizing agent is 95/5 to 60/40 (weight ratio).

13. The polarizing element according to claim 1 or 9, wherein an absolute value of the refractive index differential between the continuous phase and the dispersed phase in the stretched direction is not less than 0.1, an absolute value of the refractive index differential between the continuous phase and the dispersed phase in the direction perpendicular to the stretched direction is not more than 0.05, a mean diameter in a major axis direction of the dispersed phase is 0.8 to 10 $\mu$m, a mean diameter in a minor axis direction of the dispersed phase is 0.05 to 0.8 $\mu$m, and a mean aspect ratio of the dispersed phase is 2 to 1,000.

14. The polarizing element according to claim 1 or 9, wherein a ratio of the continuous phase relative to the dispersed phase is 99/1 to 50/50 (weight ratio).

15. The polarizing element according to claim 1 or 9, wherein transmittance of polarized light perpendicular to the stretched direction is not less than 80%, transmittance of light polarized along the stretched direction is not less than 70%, and the element imparts light-diffusing properties and polarizing properties to a transmitted light.

16. The polarizing element according to claim 1 or 9, wherein a total light transmittance of the polarizing element in the direction perpendicular to the stretched direction is not less than 80%, a total light transmittance of the polarizing element in the stretched direction is 30 to 70%, and the element imparts light-diffusing properties and polarizing properties to a transmitted light and a reflected light.

17. The polarizing element according to claim 1 or 9, wherein a total light transmittance of the polarizing element in the direction perpendicular to the stretched direction is not less than 80%, a total light transmittance of the polarizing element in the stretched direction is not more than 30%, and the element imparts light-diffusing properties and polarizing properties to a reflected light.

18. The polarizing element according to claim 1 or 9, wherein a transmittance of a light transmitted through the polarizing element linearly is not more than 10%.

19. The polarizing element according to claim 1 or 9, which has a thickness of 3 to 300 $\mu$m.

20. The polarizing element according to claim 1 or 9, wherein the stretched sheet comprises a sheet stretched monoaxially by a roll calendering.

21. The polarizing element according to claim 1 or 9, wherein an optically isotropic transparent resin layer is further laminated on a surface of the stretched sheet.

22. A flat light source unit, which comprises a tubular light source,
- a light guide member for receiving incident light from the tubular light source from the lateral side and emerging a light from a flat emerge surface, and
- the polarizing element recited in claim 1 or 9 disposed at or on a light-emerging side of the light guide member.

23. A liquid crystal display apparatus, which comprises a liquid crystal cell, and
the polarizing element recited in claim 1 or 9 disposed at or on the front side or the back side.

24. The liquid crystal display apparatus according to claim 23, which is a transmittable liquid crystal display apparatus and comprises
- a tubular light source,
- a light guide member for receiving incident light from the tubular light source from the lateral side and emerging a light from a flat emerge surface,
- a liquid crystal cell, and
- the polarizing element disposed between the light guide member and the liquid crystal cell,
- wherein the emerged light from the light guide member is polarized by the polarizing element, and the polarized light is transmitted through the liquid crystal cell.

25. A liquid crystal display apparatus according to claim 23, which is a reflection type liquid crystal display apparatus and comprises
- the polarizing element for polarizing an incident light,
- a reflection member, and
- a liquid crystal cell disposed between the polarizing element and the reflection member,
- wherein the incident light is polarized by the polarizing element, the polarized light is transmitted through the liquid crystal cell and reflected by the reflection member, the reflected light is retransmitted through the liquid crystal cell and polarized by the polarizing element.

26. A liquid crystal display apparatus according to claim 23, which is a reflection type liquid crystal display apparatus and comprises
- a liquid crystal cell,
- a reflection member, and
- the polarizing element disposed between the reflection member and the liquid crystal cell,
- wherein an incident light is transmitted through the liquid crystal cell, the transmitted light is polarized by the polarizing element and reflected by the reflection member, the reflected light is polarized by the polarizing element and transmitted through the liquid crystal cell.

* * * * *